United States Patent
Hennig

(10) Patent No.: US 11,387,693 B2
(45) Date of Patent: Jul. 12, 2022

(54) MOTOR COOLING SYSTEM AND METHOD

(71) Applicant: Aurora Flight Sciences Corporation, Manassas, VA (US)

(72) Inventor: Garrett Steven Hennig, Bristow, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 589 days.

(21) Appl. No.: 16/217,723

(22) Filed: Dec. 12, 2018

(65) Prior Publication Data
US 2020/0195065 A1 Jun. 18, 2020

(51) Int. Cl.
- *H02K 1/20* (2006.01)
- *B64D 27/24* (2006.01)
- *B64D 33/08* (2006.01)
- *H02K 9/16* (2006.01)
- *B64C 29/00* (2006.01)

(52) U.S. Cl.
CPC .............. *H02K 1/20* (2013.01); *B64D 27/24* (2013.01); *B64D 33/08* (2013.01); *H02K 9/16* (2013.01); *B64C 29/0033* (2013.01)

(58) Field of Classification Search
CPC .......... B64D 27/24; B64D 33/08; H02K 1/32; H02K 1/20; H02K 9/16; H02K 9/22; H02K 9/08
USPC ..................................................... 310/59, 61
See application file for complete search history.

(56) References Cited

U.S. PATENT DOCUMENTS

| | | | |
|---|---|---|---|
| 6,873,085 | B2 | 3/2005 | Graham |
| 7,042,121 | B2 | 5/2006 | De Filippis |
| 7,559,191 | B2 | 7/2009 | Parks |
| 7,976,291 | B2 | 7/2011 | Vinson |
| 2002/0171306 | A1 | 11/2002 | Graham |

(Continued)

FOREIGN PATENT DOCUMENTS

| | | | |
|---|---|---|---|
| DE | 596337 | * | 4/1934 |
| EP | 2752976 A2 | | 7/2014 |

(Continued)

OTHER PUBLICATIONS

Oldenburg (DE-596337) English Translation (Year: 1934).*
Extended European search report for EU application No. 119196757.9, dated Apr. 1, 2019.

*Primary Examiner* — Tulsidas C Patel
*Assistant Examiner* — Robert E Mates
(74) *Attorney, Agent, or Firm* — Michael Stanley Tomsa; McAndrews, Held & Malloy, Ltd.; Eugene H. Nahm

(57) ABSTRACT

A thrust assembly motor is described, which can be used in a distributed electric propulsion system. The thrust assembly motor may include a revolved-wedge shaped ring on a leading edge of a motor stator, with a row of axial stator blades extending therefrom. The revolved-wedge shaped ring provides a mounting surface for the axial stator blade row while also controlling the ratio of airflow mass entering the outer gap versus the inner gap. The axial stator blade row, mounted to the revolved-wedge shaped ring, is configured to convert tangential kinetic energy (i.e., associated with a velocity component of the airflow) in the cooling airflow aft of the cooling fan rotors into static pressure rise after interaction with the axial stator blade row, during flight of the hybrid-propulsion aircraft.

18 Claims, 17 Drawing Sheets

(56) References Cited

U.S. PATENT DOCUMENTS

| | | | |
|---|---|---|---|
| 2017/0203839 A1* | 7/2017 | Giannini | ................ B64D 27/24 |
| 2020/0021163 A1* | 1/2020 | Lhotellier | ................ H02K 5/18 |

FOREIGN PATENT DOCUMENTS

| | | | | |
|---|---|---|---|---|
| EP | 3231650 A1 * | 10/2017 | ............... B60K 1/00 |
| EP | 3290716 A1 | 3/2018 | |
| EP | 3354903 A1 | 8/2018 | |
| WO | WO-2010036743 A1 * | 4/2010 | ............... H02K 9/14 |
| WO | 2017/123699 A1 | 7/2017 | |
| WO | WO-2018060565 A1 * | 4/2018 | ............... H02K 5/18 |

* cited by examiner

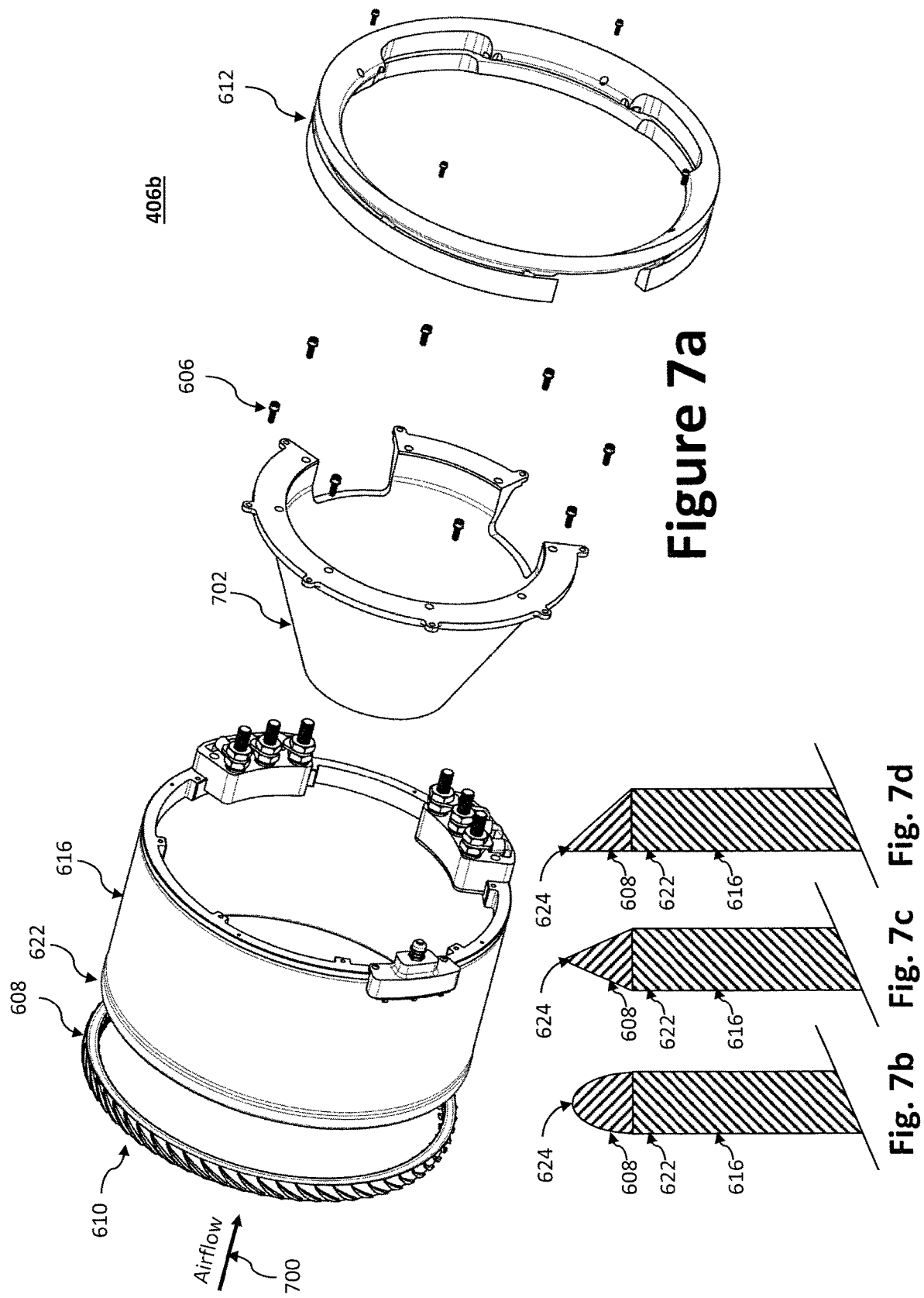

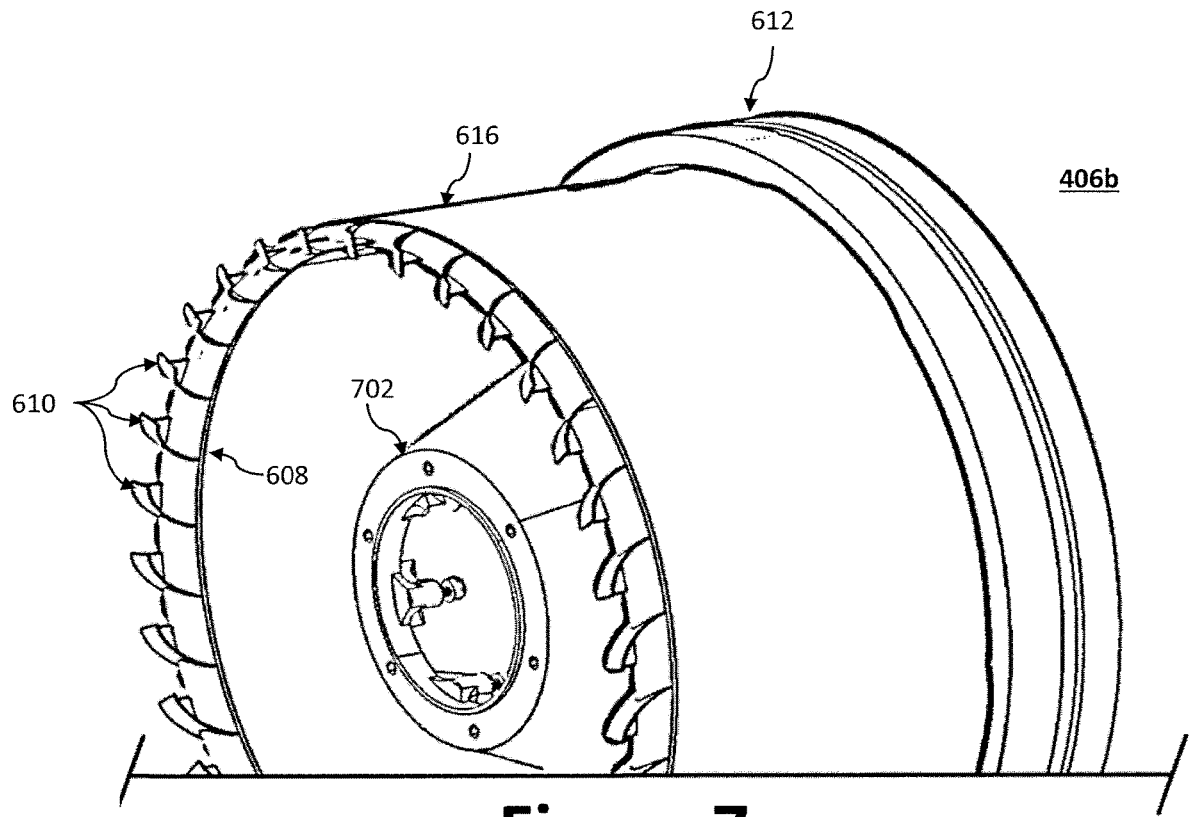
Figure 7g
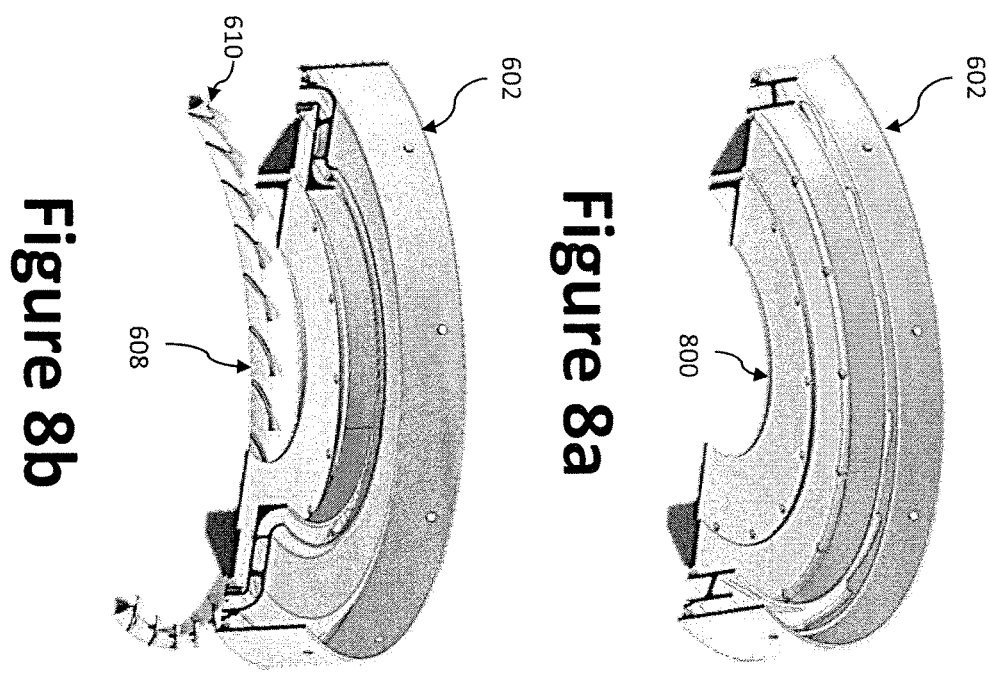
Figure 8b
Figure 8a

MOTOR COOLING SYSTEM AND METHOD

STATEMENT OF GOVERNMENT INTEREST

This invention was made with government support under Contract Number: HR0011-14-C-0014 awarded by the Defense Advanced Research Projects Agency (DARPA). The government has certain rights in the invention.

FIELD

The present disclosure relates to the field of electric and hybrid-electric propulsion systems; more particularly, to a system, method, and apparatus for cooling an electric motor.

BACKGROUND

There has long been a need for vertical take-off and landing ("VTOL") vehicles that are capable of being deployed from confined spaces. In fact, many situations favor vehicles, specifically unmanned aerial vehicles ("UAVs"), which can launch and recover vertically without requiring complex or heavy ground support equipment. The ability to deploy a UAV organically is particularly attractive in situations where a runway is unavailable or inaccessible. Until recently, however, the efficiency penalty associated with incorporating a hover phase of flight, the complexity associated with transition from vertical (e.g., hover) to horizontal flight (e.g., forward flight, or cruise), and the necessity to reduce or eliminate exposure of ground personnel to exposed high-speed rotors have hindered attempts to develop efficient VTOL UAVs.

As new hybrid platforms and improved hybrid propulsion systems are incorporated into vehicles, cooling of the motor assemblies becomes more complicated. For example, high-performance motors for aerospace or marine applications may use a variety of cooling systems, such as liquid cooling, dedicated cooling fans, variable spacing between stator and rotor, and other designs. However, previous attempts have focused on terrestrial power distribution (e.g., wind turbines). Such motors and systems were heavy, large, and failed to address constraints relevant to aircraft, such as mass of the system, volume of the housing and components, and structural integrity, where a high degree of structural confidence is required for components deemed worthy of flight. Thus, a need exists for motors to employ a lighter weight and more efficient system to cool the aircraft thrust assembly during operation.

SUMMARY

The present disclosure relates to the field of electric and hybrid-electric propulsion systems; more particularly, to a system, method, and apparatus for cooling an electric motor.

According to a first aspect, a motor assembly comprises: a stator assembly; a rotor assembly operatively coupled with the stator assembly; and a plurality of axial stator blades extending from a leading edge of stator assembly, wherein the plurality of axial stator blades is configured to convert, during operation, tangential kinetic energy of an airflow from the rotor assembly to static pressure rise.

In certain aspects, the stator assembly comprises a stator ring mounted to a leading edge of a stator housing, the stator ring comprising the plurality of axial stator blades.

In certain aspects, the stator assembly further comprises a cooling flow exit guide, wherein the stator housing is positioned between the stator ring and the cooling flow exit guide.

In certain aspects, each of said plurality of axial stator blades is arranged around and extending from the stator ring and arranged to wrap around a portion of a leading edge of the stator ring.

In certain aspects, a cross-section of a leading edge of the stator ring defines one of a wedge, a rectangular, triangular, or circular shape.

In certain aspects, the stator assembly is operatively coupled with the rotor assembly to define an inner gap and an outer gap.

In certain aspects, the stator ring is configured to control a ratio of airflow mass entering the outer gap and the inner gap.

In certain aspects, a leading edge of the stator ring is biased to control the ratio of airflow mass entering the outer gap and the inner gap.

In certain aspects, the rotor assembly comprises a rotor cap and a rotor housing, wherein the rotor cap and the rotor housing are concentric.

In certain aspects, the rotor cap comprises a plurality of fins arranged to yield a radial fan.

In certain aspects, at least one of the plurality of axial stator blades defines a generally semi-circular shape.

In certain aspects, the plurality of fins is arranged to direct cooling air to the plurality of axial stator blades.

In certain aspects, the plurality of axial stator blades is configured to de-swirl the cooling air.

According to a second aspect, a method of forming an electric motor comprises: providing a stator ring having a plurality of axial stator blades, wherein the stator ring is configured to couple with a stator assembly of the electric motor; mounting the stator ring to the stator assembly such that the plurality of axial stator blades is arranged on a leading edge of the stator assembly, wherein the plurality of axial stator blades is configured to convert, during operation, tangential kinetic energy of an airflow from the rotor assembly to static pressure rise.

In certain aspects, the stator ring comprises a metal material.

In certain aspects, the stator ring comprises a composite material.

In certain aspects, a cross-section of a leading edge of the stator ring defines a wedge shape.

In certain aspects, a cross-section of a leading edge of the stator ring defines one of a rectangular, triangular, or circular shape.

In certain aspects, the stator assembly further comprises a cooling flow exit guide.

In certain aspects, each of said plurality of axial stator blades is arranged around and extending from the stator ring and arranged to wrap around a portion of a leading edge of the stator ring.

DESCRIPTION OF THE DRAWINGS

These and other advantages of the present disclosure will be readily understood with the reference to the following specifications and attached drawings wherein:

FIG. 1b illustrates a front isometric view of the hybrid-propulsion aircraft of FIG. 1a.

FIGS. 7a through 7d illustrate an exploded view of an example stator assembly.

FIG. 7g illustrates an example shape and orientation of stator blades relative to the stator assembly according to a second aspect.

FIGS. 8a and 8b illustrate cross-sectional perspective views of an example rotor cap assembly and stator ring with stator blades according to the second aspect.

DETAILED DESCRIPTION

Figure 1A:
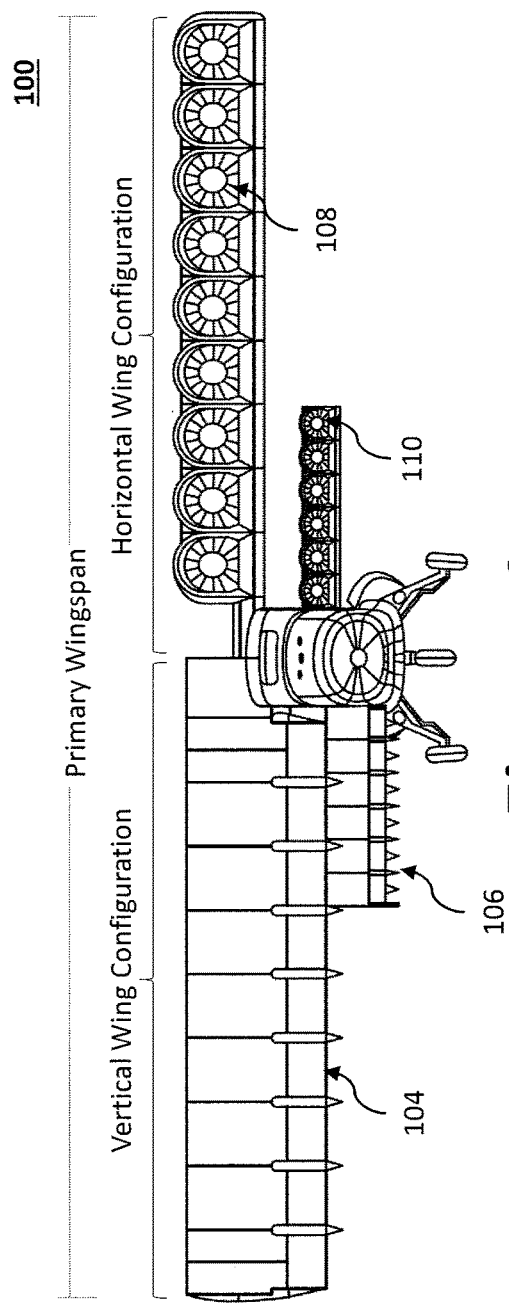
FIG. 1a illustrates a front view of an example hybrid-propulsion aircraft.

Preferred embodiments of the present disclosure will be described hereinbelow with reference to the accompanying drawings. In the following description, well-known functions or constructions are not described in detail because they may obscure the disclosure in unnecessary detail. For this disclosure, the following terms and definitions shall apply.

The terms "aerial vehicle" and "aircraft" refer to a machine capable of flight, including, but not limited to, traditional aircraft and VTOL aircraft. VTOL aircraft may include both fixed-wing aircraft (e.g., Harrier jets), rotorcraft (e.g., helicopters), and/or tilt-rotor/tilt-wing aircraft.

The terms "circuits" and "circuitry" refer to physical electronic components (i.e., hardware) and any software and/or firmware ("code") which may configure the hardware, be executed by the hardware, and or otherwise be associated with the hardware. As used herein, for example, a particular processor and memory may comprise a first "circuit" when executing a first set of one or more lines of code and may comprise a second "circuit" when executing a second set of one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z".

The terms "communicate" and "communicating" refer to (1) transmitting, or otherwise conveying, data from a source to a destination, and/or (2) delivering data to a communications medium, system, channel, network, device, wire, cable, fiber, circuit, and/or link to be conveyed to a destination. The term "database" as used herein means an organized body of related data, regardless of the manner in which the data or the organized body thereof is represented. For example, the organized body of related data may be in the form of one or more of a table, a map, a grid, a packet, a datagram, a frame, a file, an e-mail, a message, a document, a report, a list, or data presented in any other form.

The term "composite material" as used herein, refers to a material comprising an additive material and a matrix material. For example, a composite material may comprise a fibrous additive material (e.g., fiberglass, glass fiber ("GF"), carbon fiber ("CF"), aramid/para-aramid synthetic fibers, FML, etc.) and a matrix material (e.g., epoxies, polyimides, aluminum, titanium, and alumina, including, without limitation, plastic resin, polyester resin, polycarbonate resin, casting resin, polymer resin, thermoplastic, acrylic resin, chemical resin, and dry resin). Further, composite materials may comprise specific fibers embedded in the matrix material, while hybrid composite materials may be achieved via the addition of some complementary materials (e.g., two or more fiber materials) to the basic fiber/epoxy matrix.

The term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by an operator-configurable setting, factory trim, etc.). As used herein, the words "about" and "approximately," when used to modify or describe a value (or range of values), mean reasonably close to that value or range of values. Thus, the embodiments described herein are not limited to only the recited values and ranges of values, but rather should include reasonably workable deviations A hybrid-propulsion aircraft can provide increased maneuverable and agility, particularly in horizontal flight, where it has demonstrated roll and pitch rates akin to a helicopter. A hybrid-propulsion aircraft is hybrid electric in that it generates propulsion using a plurality of independently controllable alternating current (AC) motor-driven ducted fans, which receive AC power from one or more turbine-driven generators, for example, three generators. The thrust from the ducted fans may be independently controlled using variable pitch fans (e.g., via a pitch control mechanism), while the electric motors are spun at same speed and synchronized with a generator coupled thereto. The hybrid-propulsion aircraft may further employ a tilt-wing and adjustable thrust nozzles to direct and control the thrust generated by each of the ducted fans.

A hybrid-propulsion aircraft offers a number of advantages. First, it allows for vertical take-off and landing, while mitigating undesirable transient behaviors during transition from vertical flight (i.e., hover) to horizontal flight. That is, the hybrid-propulsion aircraft provides a fast and constant-altitude transition, which does not require that the hybrid-propulsion aircraft climb or dive in order to transition. Second, the aircraft is trimmable at any point in the airspeed range, without any unstable regimes or thrust deficits during transition. Third, the hybrid-propulsion aircraft is highly efficient in both vertical and horizontal flight, while traditional VTOL aircraft are much less in one or the other. Fourth, the hybrid-propulsion aircraft does not employ exposed rotor blades (e.g., fan blades), which can threaten the safety of passengers, ground crew, or equipment. Rather, the hybrid-propulsion aircraft's fan blades and thrust assemblies are shrouded by, for example, the wing structure, or portion thereof. Fifth, the hybrid-propulsion aircraft's wake is cold, and is at the extremes of the aircraft. Sixth, the payload bay and cockpit are near the ground, thereby providing increased accessibility. Finally, the hybrid-propulsion aircraft provides large amounts of payload power at cruise when propulsive power draws are minimal. That is, by using hybrid electric power, although most of the electric power may be required during vertical flight, a significant amount of excess power is available during horizontal flight.

While a hybrid-propulsion aircraft offers a number of advantages, it can be difficult to regulate the temperature of the electric motors (e.g., those used by the plurality of ducted fans to drive the fans). Conventional, low-performance motors can be cooled passively by convective air-cooling (e.g., air from the environment flowing over the motor). As motor rotors rotate during operation, an amount of forced convection provides cooling for multiple motor parts exposed to the airflow current. Some simple motors can employ a heat sink to aid in cooling, such as absorbing and/or distributing heat from the stator to a motor chassis via a heat conductive path (e.g., metallic vanes, windings, fluid cooled conduits, etc.). This synergistic approach increases the available surface area for cooling.

By contrast to simple, low-performance motors, however, motors with high heat/performance output relative to exposed surface area may require active cooling. For example, active cooling in terrestrial applications may require an additional fan, either directly attached to, or otherwise driven by, the motor shaft. This increases the mass airflow rate and raises the local velocity of the airflow, which increases the convective coefficient on the limited surface area of the motor and thereby provides additional cooling. Additionally, or alternatively, high-performance motors for aerospace or marine applications may use liquid cooling systems. Liquid cooling is useful in situations where the temperature difference between the motor and the surrounding fluid is too low to transfer heat between mediums effectively. Moreover, liquid cooling may be one of few cooling options for applications where the motor is surrounded by low-density fluid or a vacuum.

Previous attempts to address the issues related cooling as described herein focused on terrestrial power distribution (e.g., wind turbines). Such motors and systems were heavy, large, and failed to address constraints relevant to aircraft, such as mass of the system, volume of the housing and components, and structural integrity, where a high degree of structural confidence is required for components deemed worthy of flight. For at least the reasons disclosed herein, electric motors (e.g., a fan motor in an aircraft) employing stator blades have a lighter relative weight and are more efficient to operate. Accordingly, disclosed herein is a revolved-wedge shaped ring that may be provided on a leading edge of a motor stator to facilitate cooling of the electric motor and its components. As will be described below in greater detail, the revolved-wedge shaped ring may include a row of axial stator blades extending therefrom (e.g., along the perimeter of the motor stator, or component thereof). The revolved-wedge shaped ring may be used to control the ratio of airflow mass to one or more thin gaps in the motor assembly.

Figure 1B:
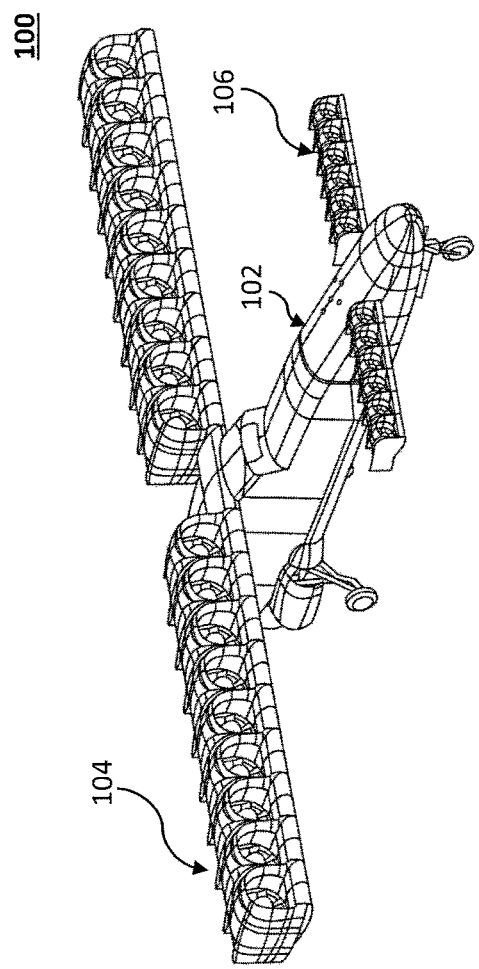
Figure 1C:
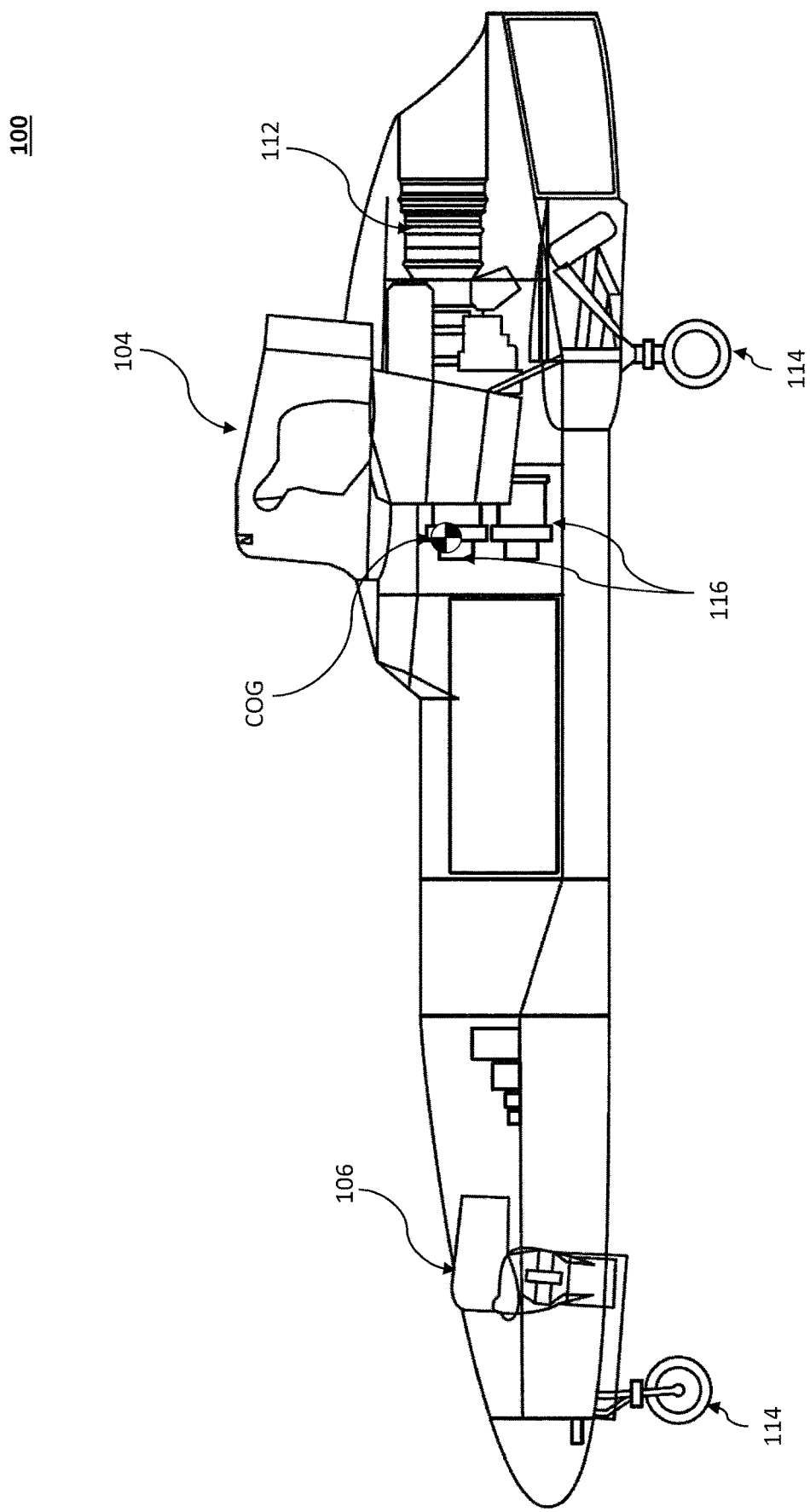
FIG. 1c illustrates a side view of the hybrid-propulsion aircraft with body panel portions omitted.

FIGS. 1a through 1c illustrate an example hybrid-propulsion aircraft 100. FIG. 1a illustrates a front view of the hybrid-propulsion aircraft 100, while FIG. 1b illustrates a side view of the hybrid-propulsion aircraft 100. FIG. 1a illustrates one side of the hybrid-propulsion aircraft 100 in a vertical wing configuration (vertical flight mode) to generate vertical thrust, and the opposite side of the hybrid-propulsion aircraft 100 in a horizontal wing configuration (horizontal flight mode) to generate horizontal thrust. FIG. 1c illustrates a side view of the hybrid-propulsion aircraft 100 with body panel portions omitted to better illustrate certain of the internal components of the hybrid-propulsion aircraft 100.

The hybrid-propulsion aircraft 100 is generally described as being unmanned and fully autonomous (i.e., requiring no remote control pilot), but a cockpit may be added to enable manned operation. Similarly, the hybrid-propulsion aircraft 100 may be remotely controlled over a wireless communication link by a human operator, computer operator (e.g., remote autopilot), or base station. The hybrid-propulsion aircraft 100 can also accommodate a cabin between the primary and canard wings 104, 106 configured to carry passengers.

Figure 2A:
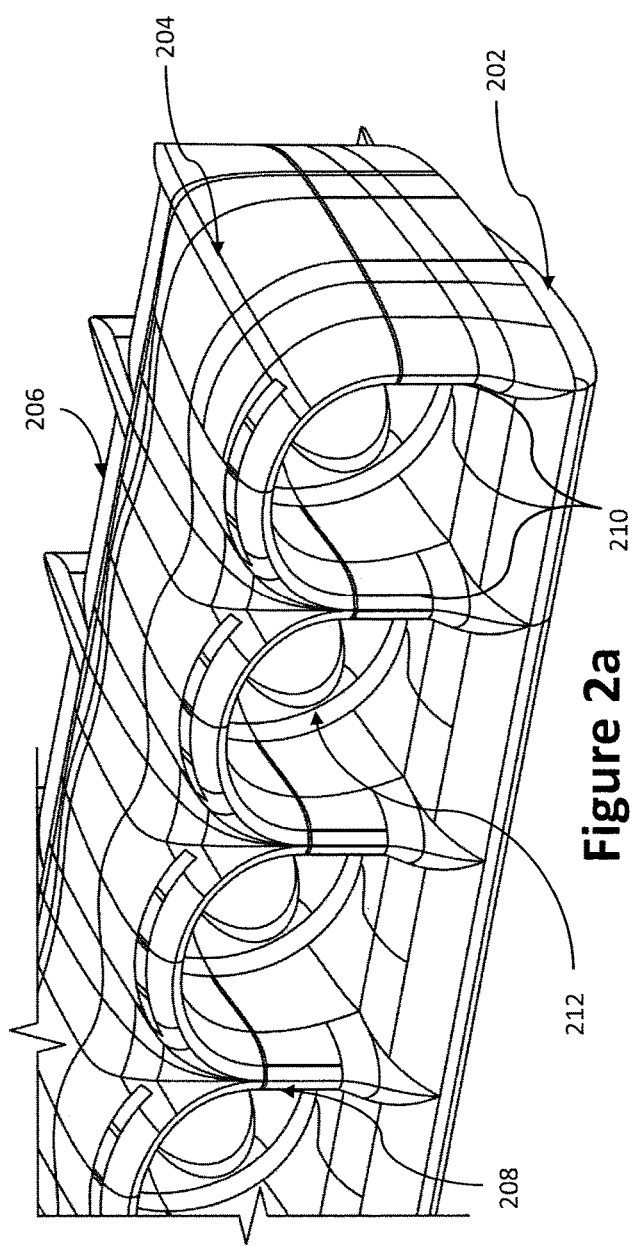
FIGS. 2a and 2b illustrate, respectively, front and rear isometric views of a ducted fan arrangement.
Figure 2B:
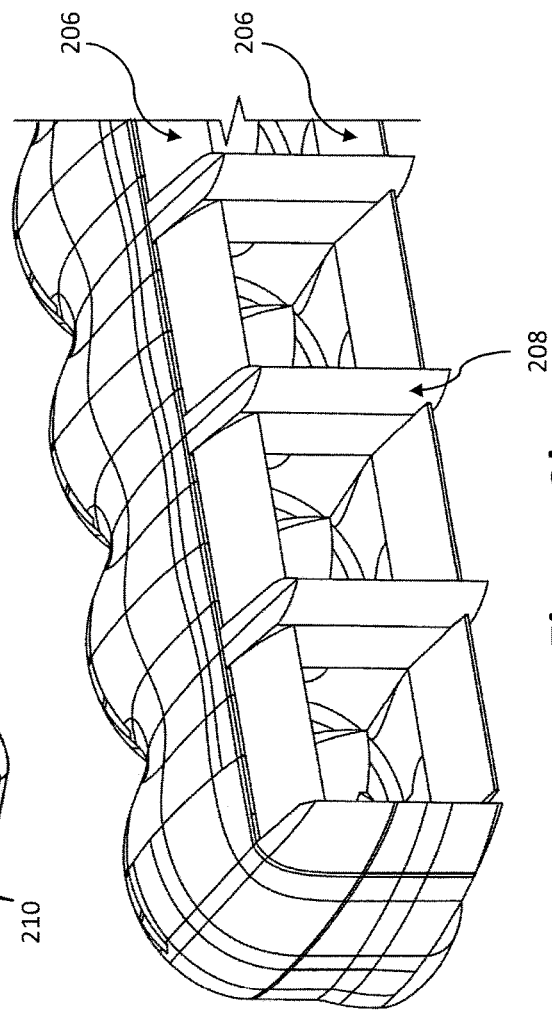

A hybrid-propulsion aircraft 100 may generally comprise a fuselage 102, two primary wings 104, two canard wings 106, and a distributed electric propulsion system, which generates the thrust necessary for flight using a plurality of ducted fans (e.g., primary ducted fans 108 and canard ducted fans 110) that are driven by electric motors. For example, as best illustrated in FIGS. 2a and 2b, each wing may be arranged with a plurality of immediately adjacent (i.e., abutting one another) integrated ducted fans across the wingspan of a wing or wing set. Each of the ducted fans generally comprises a thrust assembly 212 positioned within a duct chamber 210, the duct chamber 210 being defined by the lower and upper airfoils 202, 204 and ribs of the primary and canard wings 104, 106.

To provide climate control to the engine bay, one or more cutouts or openings may be provided in the fuselage's 102 skin (e.g., adjacent the engine 112 and/or primary generators 116). One or more cooling fans may be positioned in the engine bay at each opening and configured to draw air into the engine bay, thereby cooling the engine 112, primary generators 116, and/or other components. The engine 112 may include one or more starter batteries to provide a starting current to said engine 112 upon ignition. The cooling fans also pressurize the engine bay and force air through an exhaust, or gap in the fuselage. The landing gear 114 may be retractable with a door, thereby reducing drag during horizontal flight.

The hybrid-propulsion aircraft's 100 structure, including the fuselage 102 and wings 104, 106, may be fabricated using a composite material (or laminate thereof) including, inter alia, a graphite, fiberglass, or aramid and honeycomb core sandwich construction and connected using metal fittings (e.g., aluminum, titanium, lightweight alloys, etc.).

As best illustrated in FIGS. 1a and 1b, a primary wing 104 and a canard wing 106 are positioned on each side of the fuselage 102. The two primary wings 104, defining a primary wing set, and two canard wings 106, defining a canard wing set, are pivotally mounted to the hybrid-propulsion aircraft's 100 airframe (e.g., at the topside of the fuselage 102) to provide tilt-wing functionality. For instance, the fuselage 102 may comprise a plurality of actuator-controlled pivotal connectors, which selectively pivot the primary and canard wings 104, 106 responsive to signals from the flight controller. In certain aspects, the canard wings 106 may be partially or fully retracted into the fuselage 102 when not in use or during forward flight.

The distributed electric propulsion system generally comprises an engine 112, a gearbox, one or more primary generators 116, and a plurality of ducted fans, each of said plurality of ducted fans being driven by an electric motor. The plurality of ducted fans may include a plurality of primary ducted fans 108 positioned on the primary wings 104 and a plurality of canard ducted fans 110 positioned on the canard wings 106. As illustrated, the engine 112 may be configured to drive a gearbox. Suitable engines 112 include, for example, turbo shaft and turbine engines. A turbo shaft engine refers to a gas turbine engine that is optimized to produce shaft power, rather than jet thrust. The engine 112 may be mounted to, for example, a first bulkhead, while the gearbox mounted to a second bulkhead.

The distributed electric propulsion system can use an all-electric drivetrain. The engine 112 and the primary generators 116 may be locally situated, thereby obviating the need for a long driveshaft therebetween, and obviating the need for any driveshaft between the primary generators 116 and electric motors (which could result in efficiency loss). For example, the engine 112 and the primary generators 116 may be directly coupled to the gearbox. Moreover, because the primary generators 116 and electric motors 406 operate in synchronization and at a single voltage and frequency, electronics need not be used between the generator 116 and the electric motors 406 to invert or convert the voltage of the power supply or commutate/modulate the frequency.

The gearbox, in turn, can be coupled with a plurality of generators, including one or more primary generators 116 (e.g., 1 to 5 generators, or about generators) and/or one or more auxiliary power generators, which may power onboard accessories or systems. The primary generators 116 provide power to the plurality of electric motors (e.g., fan motors). Each ducted fan may therefore employ a thrust assembly 212 having an electric motor 406 (see, e.g., FIGS. 6a-6c). The electric motor 406 may vary in size and power rating depending its purpose, which may be dictated by its position on the hybrid-propulsion aircraft 100 and/or required thrust. One of skill in the art, however, would appreciate that additional, or fewer, primary generators 116 may be used depending on the desired power or thrust, which is guided by, inter alia, the quantity and/or size of the ducted fans (or motors therein).

FIGS. 2a and 2b illustrate, respectively, front and rear isometric views of an arrangement of ducted fans, such as those forming the primarily wing 104 and/or the canard wing 106. As illustrated, a duct chamber 210 is defined by a lower airfoil 202, an upper airfoil 204, and one or more separator plates 208, which are positioned between adjacent thrust assemblies 212. The trailing edge of the upper and lower airfoils 202, 204 may comprise a plurality of control surfaces 206 (e.g., ailerons or elevens), which may be independently controlled to adjust the thrust nozzle. For instance, the control surfaces 206 may be controlled to adjust the thrust nozzle's area (i.e., nozzle area) of a particular ducted fan. That is, the nozzle actuators (positioned within the separator plates 208) may be actuated to drive the control surfaces 206, thereby adjusting the nozzle area and thrust vector. The control surfaces 206 have flattened inner surfaces to yield high speed performance, while thick separator plates 208 allow change in lower area ratios without separation. The separator plates 208 may comprise a rib covered by a fairing, which may house one or more controllers or actuators (e.g., a nozzle actuator).

Figure 3A:
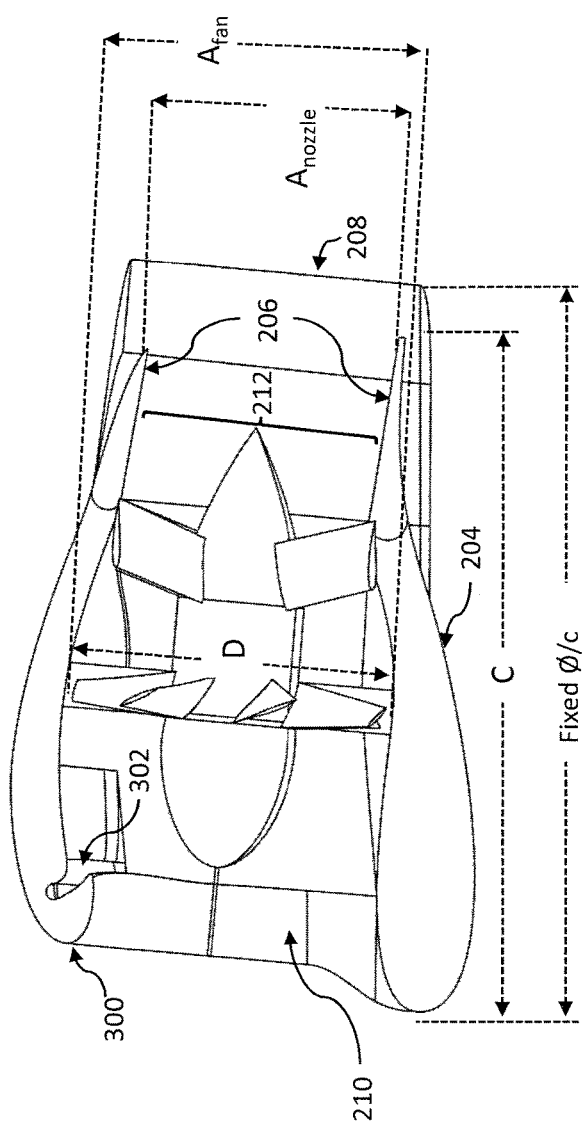
FIGS. 3a and 3b illustrate, respectively, side and top cross-sectional views of a ducted fan.
Figure 3B:
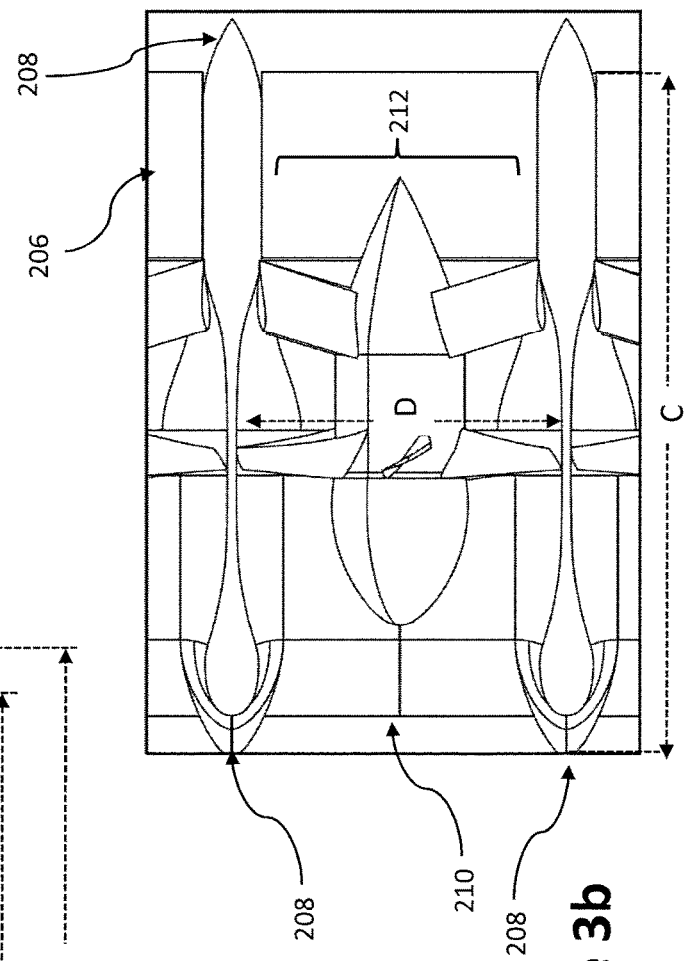

FIGS. 3a and 3b illustrate, respectively, side and top cross-sectional views of a ducted fan. As illustrated, the ratio of the length (C) to diameter (D) of the duct chamber 210 is relatively short. One or more airflow slots 302 may be positioned at the upper leading edge 300 of the upper airfoil 204. The one or more airflow slots 302 guide airflow into the duct chamber 210 and toward the thrust assembly 212. Each airflow slot 302 may be selectively sealed/blocked using a slot door. The airflow slots 302 in the upper leading edge maintain flow attachment inside the duct chamber 210 in vertical flight mode and at high angle of attack (AoA). The slot doors may be lightly sprung to ensure that they close properly for horizontal flight, whereby a pressure differential will pull the slot doors open when needed for flow control.

Figure 4A:
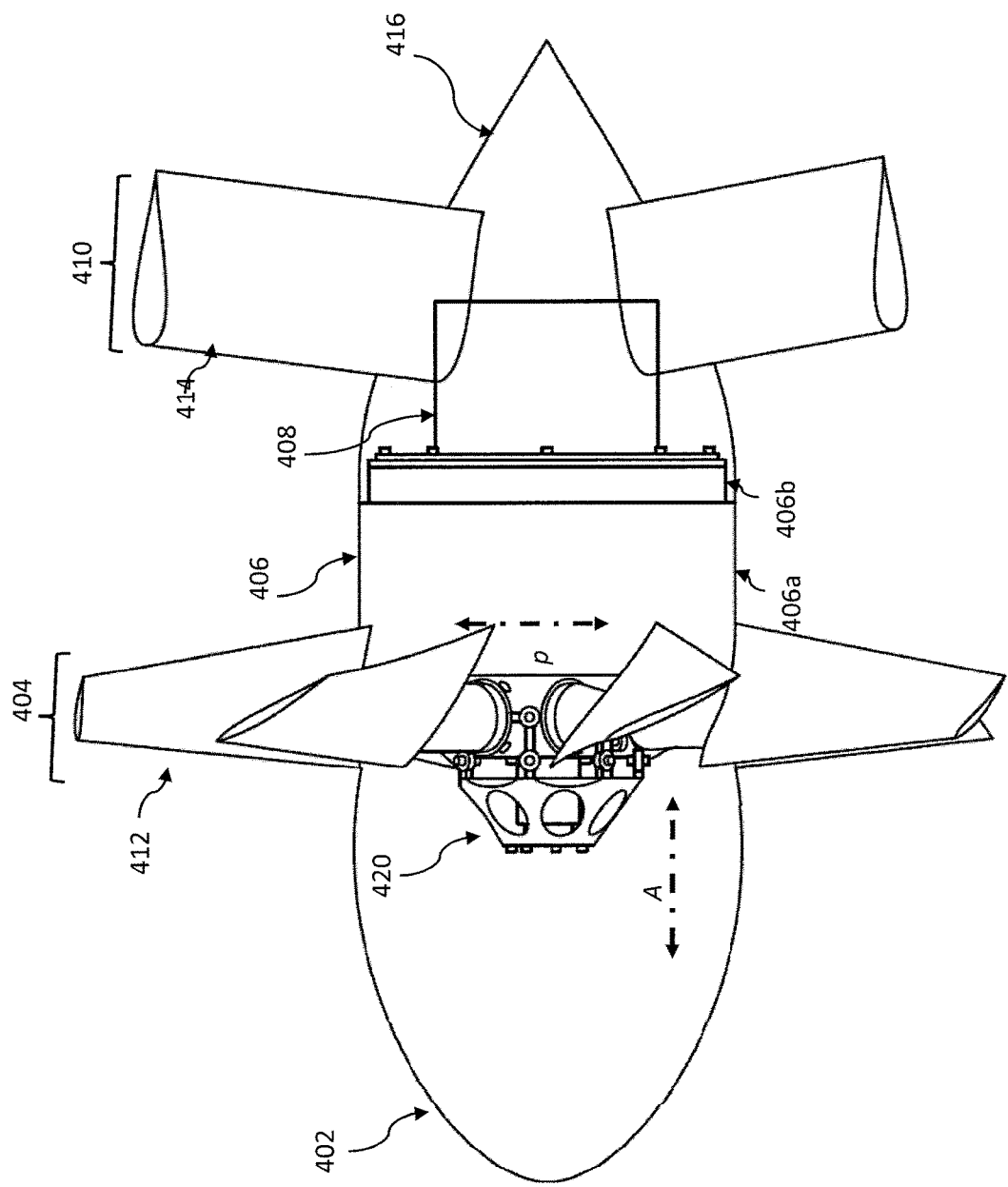
FIGS. 4a through 4c illustrate an example thrust assembly.
Figure 4C:
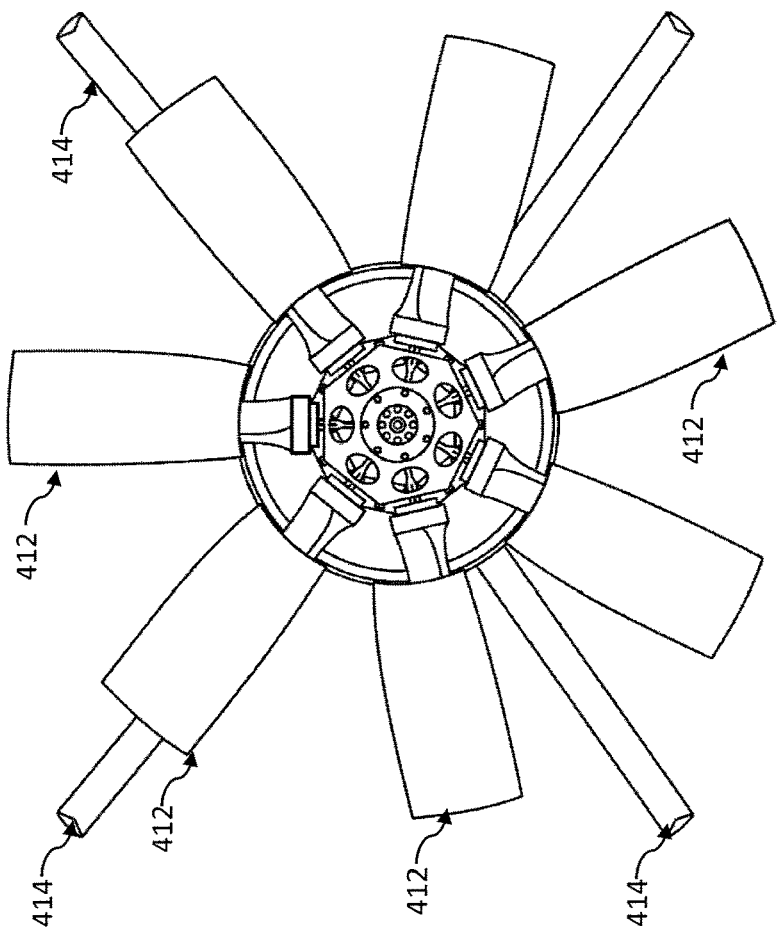
Figure 4B:
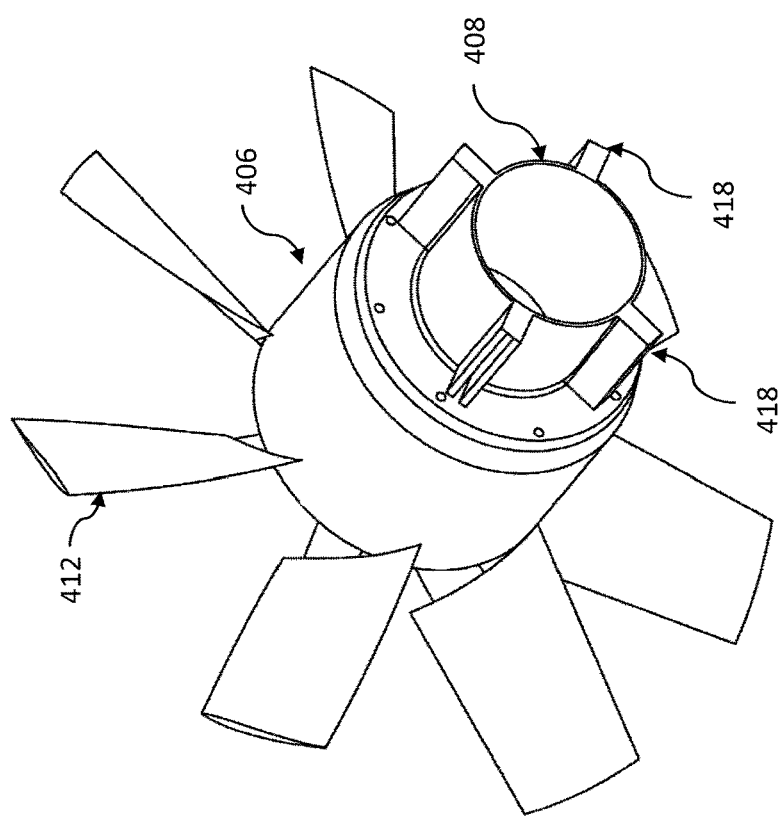

FIGS. 4a through 4c illustrate an example thrust assembly 212, which may be configured with a pitch control mechanism 420. FIG. 4a illustrates a side view of a complete thrust assembly 212, which may generally comprise a nacelle 402, an axial fan assembly 404, an electric motor 406, a structural hub 408, an aero stator 410, and a fairing cone 416. The axial fan assembly 404 may comprise a plurality of fan blades 412 (e.g., 2 to 10, more preferably 4 to 7 fan blades 412), while the aero stator 410 comprises a plurality of stator blades 414 (e.g., 2 to 6, more preferably 4 stator blades 414). The electric motor 406 generally comprises a rotor assembly 406a and a stator assembly 406b. The stator assembly 406b remains static (i.e., does not rotate) relative to the aircraft structure (or another structure to which the electric motor 406 is mounted), while the rotor assembly 406a rotates relative to the stator assembly 406b. In certain aspects, the rotor assembly 406a comprises inner and outer iron with magnets, while the stator assembly 406b comprises a conductive copper coil.

As illustrated in FIG. 4b, the structural hub 408 is configured with a plurality of motor securing slots 418, each being sized and shaped to receive a stator blade 414 or portion thereof. The structural hub 408 bolts the stator assembly 406b to the aero stator's 410 stator blades 414. The electric motors 406 may be brushless direct current ("BLDC") motors, which have shown to be efficient in the disclosed configuration, but other motor types may be used, including, without limitation, brushless (BL) motors, electronically commutated motors (ECMs or EC motors), brushless electric motor, squirrel cage, induction, brushed, AC motors, etc. An example brushless motor is described by U.S. Pat. No. 6,873,085, which is titled "Brushless Motor" and issued on Mar. 29, 2005. In certain aspects, the electric motors 406 used in the primary ducted fans 108 are larger than the electric motors 406 used in the canard ducted fans 110. FIG. 4c illustrates a frontal plan view of a thrust assembly 212 with the nacelle 402 removed. As illustrated, the fan blades 412 may be coupled to the rotating hub (e.g., the fan hub 600 of FIG. 6a) via a plurality of blade grips and pitch housing. The pitch of the fan blades 412 may be dynamically controlled via the pitch control mechanism 420, which may be controlled by a linear actuator (e.g., the blade-pitch actuator 614 of FIG. 6a). The pitch control mechanism 420 may comprise a pitch arm, pitch link, a torque plate, and a translating pitch cone.

Figure 5:
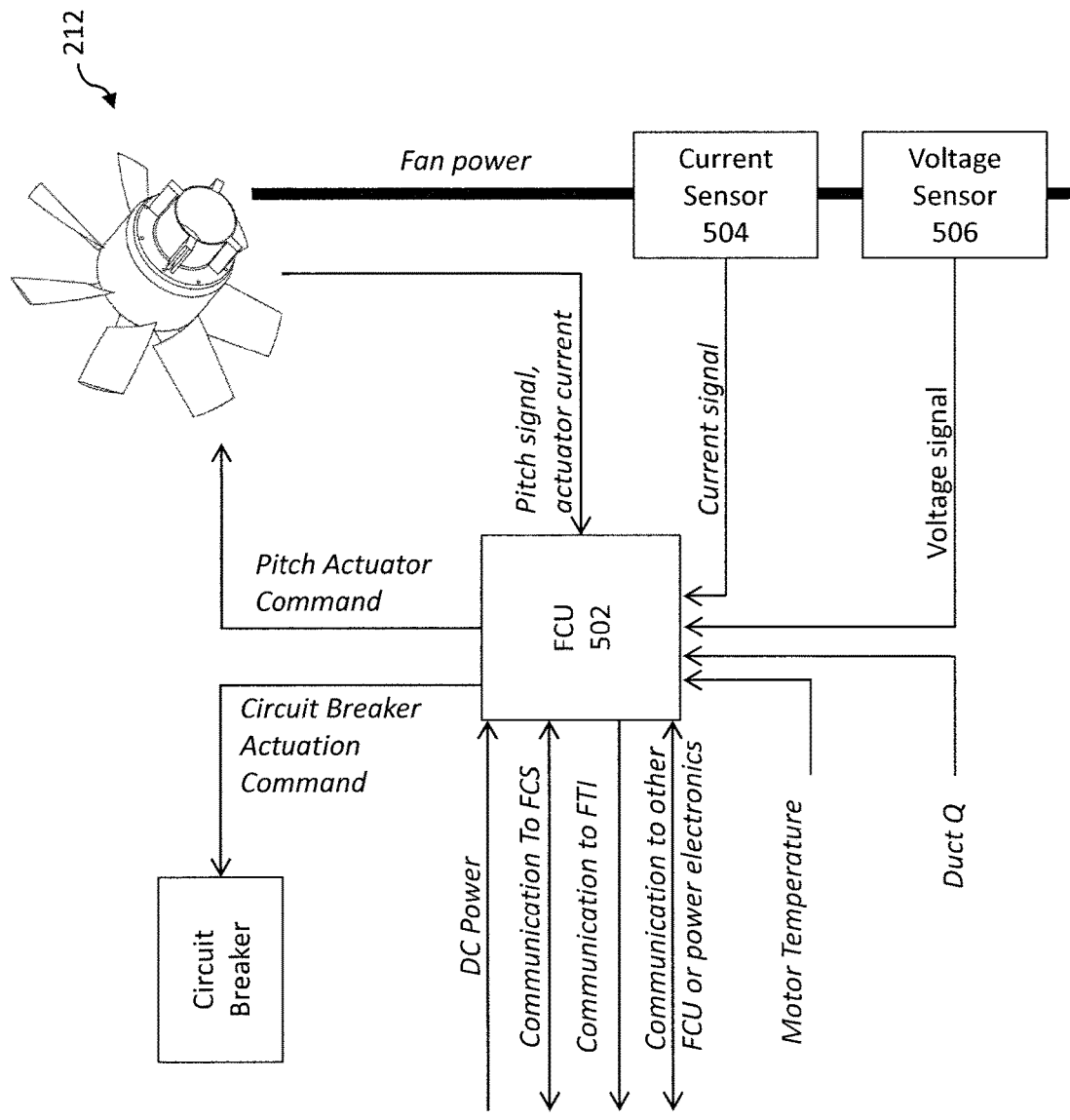
FIG. 5 illustrates a synchronization monitoring system having a flight control unit (FCU).

FIG. 5 illustrates a synchronization monitoring system 500 having a flight control unit ("FCU") 502 that prevents one electric motor 406 from falling out of synchronization with the other electric motors 406 and generator 116. In summary, the FCU 502 detects whether a fan is, or will soon be, out of synchronization through, for example, torque or current detection, waveform analysis, and comparing the phase angles of two signals. Blade pitch may be adjusted to increase or decrease a given load on the electric motor 406, while a turbine speed regulator maintains constant speed. The FCU 502 accomplishes this by monitoring the motor voltage (via voltage sensor 506) and motor current (via current sensor 504), closing the fan pitch loop to achieve the autopilot's commanded pitch, reducing pitch (and notifying the autopilot) if the torque approaches a predetermined limit, and providing fan motor parameters including, inter alia, current and voltage phasors, revolutions per minute (RPM), fan speed, temperatures, pitch, etc. to the flight controller system (FCS). Indeed, the phase angle between voltage and current may be used to predict loss of synchronization between the electric motor 406 and/or generator 116, thus enabling use of a low-risk, off the shelf hardware in lieu of custom hardware. Synchronization may be achieved by regulating the generator controller during low speed startup of the generator. For example, the FCU 502 could configure the fan blades 412 with a flat pitch to reduce load on the electric motor 406 during startup. As the electric motors 406 begin to spin with the generator 116, the blade pitch can be gradually increased. In certain aspects, the load on the electric motor 406 may be increased with each RPM to provide a more stable and robust synchronization. The FCU may also control a circuit breaker or other electronic device to de-couple a motor (e.g., a malfunctioning or defective motor) from the bus to protect the system. Additionally, the FCU may provide command and control of various power electronics that augment the electrical operation of the fan ranging from start up through normal operation including the ability to provide modal damping, braking, or temporary power boosts from a secondary power bus.

The various examples and views illustrated in FIGS. 6a through FIG. 10 are described in connection with a thrust assembly to power a primary wing 104, but the same principles may be similarly applied to the canard wing 106 or another motor, fan device, or system. To that end, the various components may be adjusted in size and shape to accommodate other electric motor applications, including terrestrial uses.

Figure 6A:
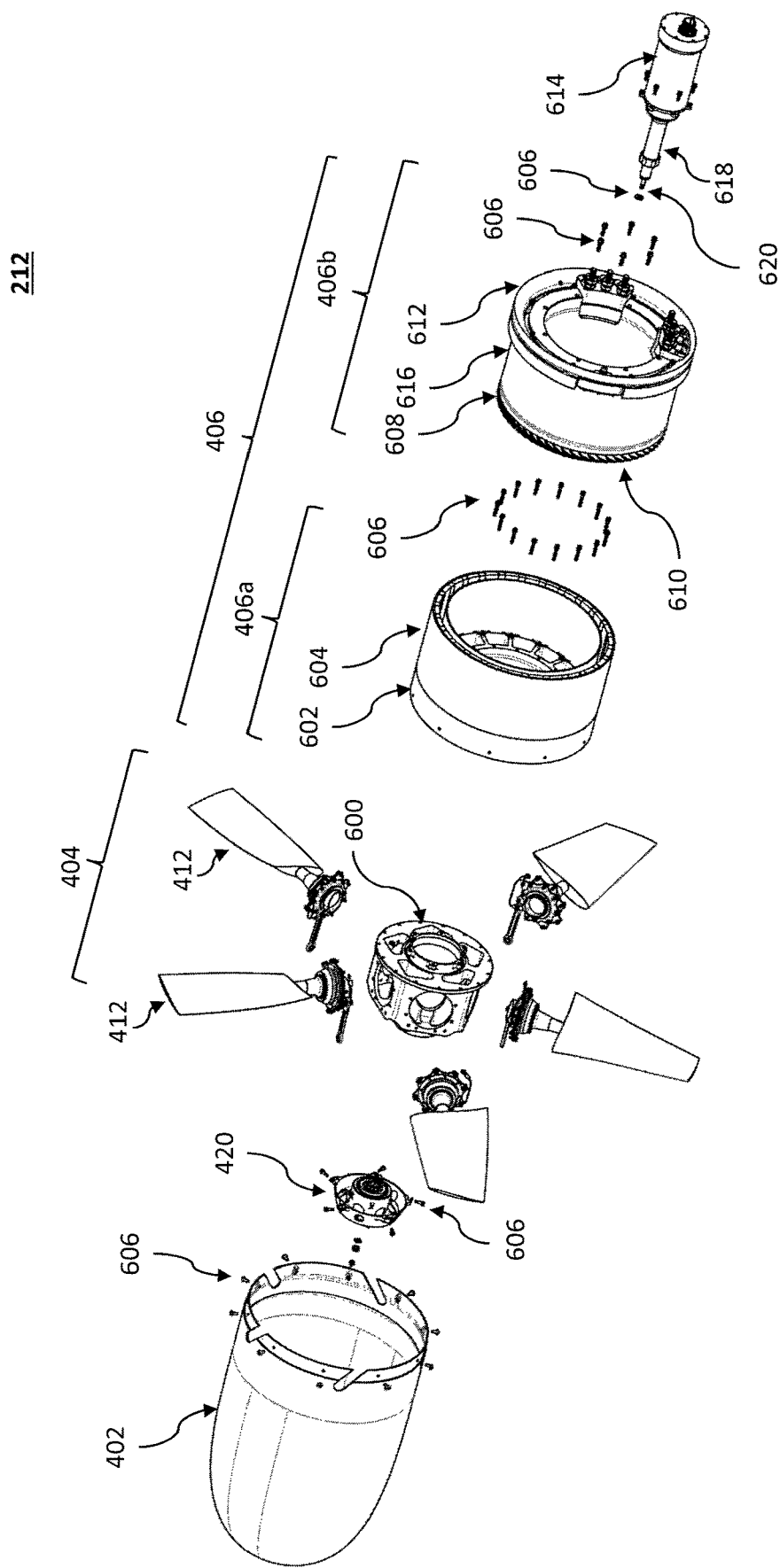
FIG. 6a illustrates an exploded, assembly view of the example thrust assembly of FIGS. 4a through 4c.

FIG. 6a illustrates an exploded view of the example thrust assembly 212 of FIGS. 4a through 4c. As illustrated, the thrust assembly 212 may comprise a nacelle 402, an axial fan assembly 404, an electric motor 406, and a blade-pitch actuator 614. The various components can be secured to one another by one or more fasteners 606 (e.g., nuts, bolts, screws, etc.) or by other fastening techniques (e.g., welding, brazing, adhesive, etc.). As illustrated, the nacelle 402 may be removed to reveal the pitch control mechanism 420, which is configured to couple with a fan hub 600 via one or more fasteners 606. As noted above, the plurality of fan blades 412 are coupled to the fan hub 600 and extend therefrom to define the axial fan assembly 404.

The electric motor 406 generally comprises a rotor assembly 406a and a stator assembly 406b. The rotor assembly 406a (shown assembled) generally comprises a rotor housing 604 and a rotor cap 602, which, as illustrated, is configured to mount to a leading edge of the rotor housing 604. The rotor cap 602 and the rotor housing 604 may be concentric (e.g., sharing an axis-of-rotation), as illustrated. The stator assembly 406b (shown assembled) may include a stator ring 608, a cooling flow exit guide 612, and a stator housing 616. As illustrated, the stator housing 616 (e.g., having stationary magnet windings) may be positioned between the stator ring 608 and the cooling flow exit guide 612. For example, the stator ring 608 may be coupled to the leading edge 622 of the stator housing 616. A plurality of stator blades 610 may be arranged along the circumference of the leading edge 624 of the stator ring 608, which is shown in greater detail, infra. In operation, the flow exit guide 612 decreases outlet losses by gradually expanding the exit flow from narrow motor gaps to the high speed duct flow.

The blade-pitch actuator 614 may be a linear actuator that is configured, such that when the thrust assembly 212 is assembled, the actuating rod 618 of blade-pitch actuator 614 passes through the electric motor 406 and the fan hub 600 to actuate (though a linear extending or retracting motion) the pitch control mechanism 420. The distal end 620 (which may be threated) of the actuating rod 618 of the blade-pitch actuator 614 may be secured to the pitch control mechanism 420 via a fastener 606 (e.g., a nut or a bolt).

Figure 6B:
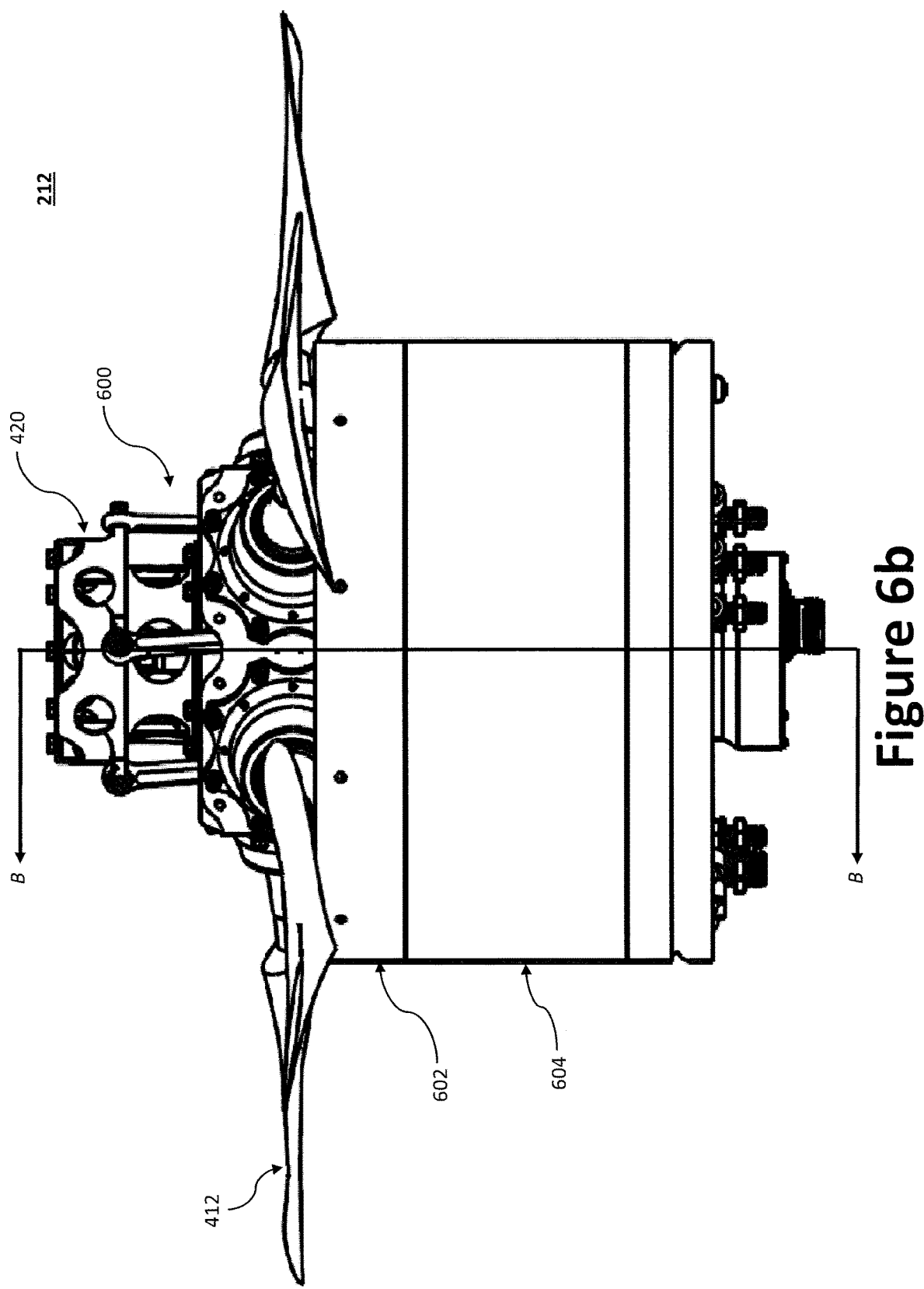
FIG. 6b illustrates a side view of the example thrust assembly.
Figure 6C:
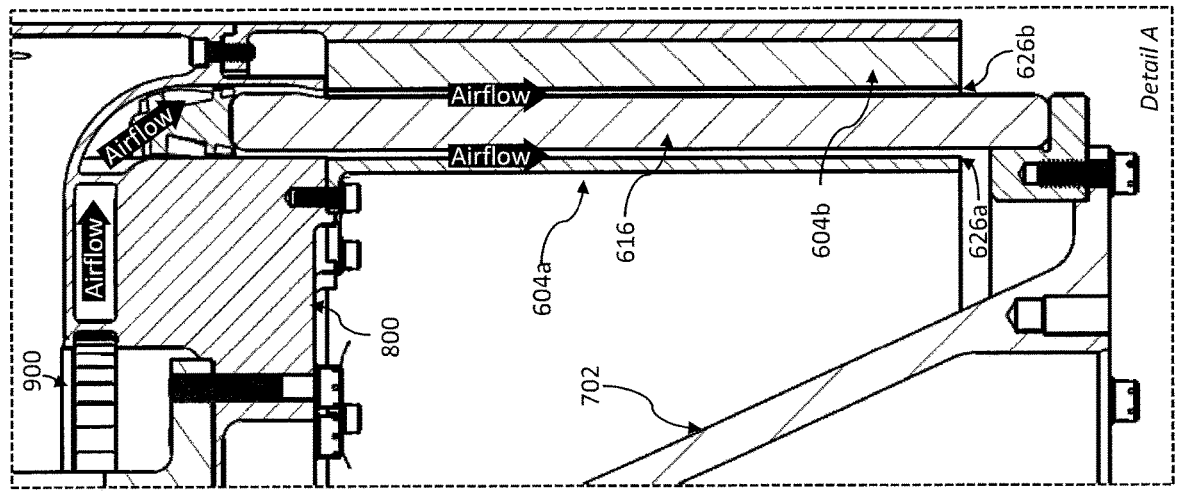
FIG. 6c illustrates a cross-sectional view of the example thrust assembly.
Figure 6C:
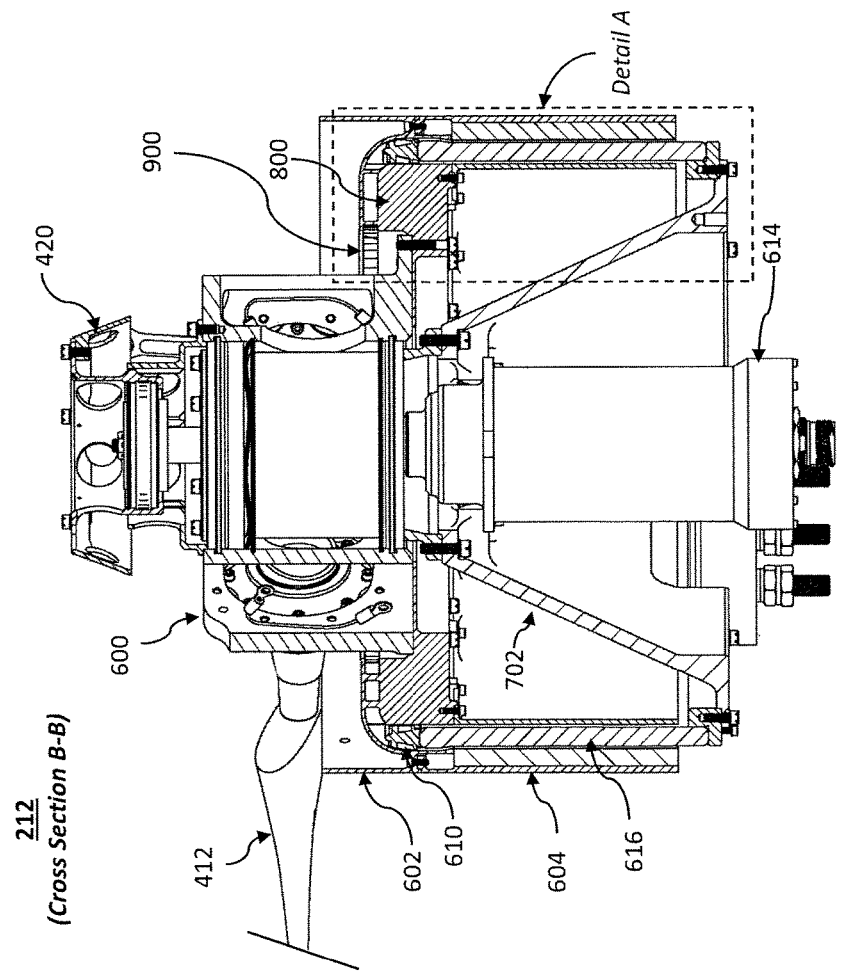

FIG. 6b illustrates an additional view of the example thrust assembly 212 with the nacelle 402 removed, while FIG. 6c illustrates a cross-sectional view of the example thrust assembly 212 (along line B-B of FIG. 6b). The example motor assembly shown in FIGS. 6b and 6c (e.g., a permanent magnet brushless air core motor) includes a stationary electro-magnet coil (e.g., part of the stator assembly 406b) and a rotating permanent magnet (e.g., as part of the rotor housing 604). The disclosed motor 406 is designed to optimize electromagnetic efficiency by minimizing the thickness of the rotor-stator gaps. Indeed, the size of the rotor-stator gap is limited by a variety of factors, including mechanical stiffness of one or more of a motor shaft, bearings, and the stator. In some examples, a plurality of fan blades 412 (defining a fan) may be driven directly from the rotor housing 604. The blade diameter, however, may be fixed by the motor housing, resulting in a limited fan rotation rate and a limited airflow rate. Thus, additional advantages are borne out by cost benefits, such as the simplicity of integral ring lug connectors and the resources used to construct the design.

As disclosed herein, cooling of the motor 406 is performed by forcing airflow through the one or more narrow rotor-stator gaps defined between the rotor housing 604 and stator housing 616 of the stator assembly 406b. To that end, a plurality of axial stator blades 610 may be located at the leading edge of the stator housing 616 (e.g., via a stator ring 608) of the stator assembly 406b to direct or force airflow through the one or more narrow rotor-stator gaps, thereby cooling the motor 406. As best illustrated in Detail A of FIG. 6c, the stator housing 616 and the rotor housing 604 are arranged to define the one or more narrow rotor-stator gaps (i.e., the narrow gaps between the rotor assembly 406a and the stator assembly 406b, which are labeled as inner gap 626a and outer gap 626b).

FIGS. 7a through 7d illustrate an exploded view of the stator assembly 406b, including the stator ring 608, motor stator mount 702, and cooling flow exit guide 612. The stator assembly 406b may be fitted with an internal motor stator mount 702 and a cooling flow exit guide 612. The stator assembly 406b, motor stator mount 702, and flow exit guide 612 can be joined by one or more fasteners 606, and/or by other joining techniques (e.g., brazing, welding, etc.). Similarly, the stator ring 608 can be coupled on the leading edge of the stator housing 616 (e.g., the edge of the stator housing 616 facing the direction of flight). FIGS. 7e and 7f illustrate additional views of an assembled stator assembly 406b. In particular, FIG. 7e illustrates a side view of the assembled stator assembly 406b, whereas FIG. 7f illustrates a rear view of the assembled stator assembly 406b (i.e., from the perspective of arrow 704 of FIG. 7e).

The airflow into the thrust assembly 212 is in the direction of arrow 700 during forward flight of the aircraft 100. As shown, a series (e.g., a string, row, or another arrangement) of stator blades 610 can be mounted to (or otherwise formed in or on) the stator ring 608 to convert the tangential component of velocity into a rise in static pressure, as well as redirecting the airflow in a direction aligned with the electric motor 406 axis and through the rotor-stator gaps. The combination of the stator ring 608 and the axial stator blades 610 serves to cool the various components of the electric motor 406. This is achieved by providing a series of the stationary, stator blades 610 on a leading edge of the stator assembly 406b (e.g., along the circumference) at the motor windings. The stator blades 610 (e.g., forming a de-swirl stator) converts the tangential component of airflow (i.e., dynamic pressure) generated by the integral fan 602 and fin 900 of the rotor assembly 406a into static pressure. An electric motor 406 employing the stator blades 610 disclosed herein can control the ratio of cooling air mass flow in the thin rotor-stator gaps (e.g., inner gap 626a and outer gap 626b) between the inner and outer portions of the rotor 604 and stator housing 616.

As illustrated in FIG. 7a, the stator ring 608 may comprise a plurality of axial stator blades 610 distributed (e.g., evenly distributed) along the circumference of the leading edge 624 (mounting surface) of the stator ring 608 of the stator assembly 406b. In this example, the stator ring 608 provides a mounting surface for the axial stator blades 610, while also controlling the ratio of airflow mass entering the inner gap 626a versus the outer gap 626b. The plurality of axial stator blades 610, when mounted to the stator ring 608, converts tangential kinetic energy (i.e., associated with a velocity component of the airflow) in the cooling airflow aft of the cooling fan rotors into static pressure rise after interaction with the axial stator blades 610, at the leading edge of the stator assembly 406b. In the illustrated example, the stator blades 610 can extend from the leading edge of the stator ring 608 toward an inner surface of the rotor cap 602 (see, e.g., FIG. 6a).

The plurality of axial stator blades 610 may also wrap around a portion of the leading edge 624 (e.g., around the wedge-shaped profile of the leading edge 624). In other words, one or more (or all) of the plurality of axial stator blades 610 may extend inward from the inner diameter of the leading edge 624 of the stator ring 608 and outwards from the outer diameter of the leading edge 624 of the stator ring 608 (i.e., straddling the profile of the leading edge 624 of the wedge-shaped stator ring 608). In some examples, the stator blades 610 may have a generally curved shape as the stator blade 610 extends from the leading edge 624 of the stator ring 608. In some examples, one or more of the stator blades 610 can be defined by a different curve than another blade, including a flat or planar blade. In some examples, each of the stator blades 610 may be spaced evenly from (e.g., relative to) one another such that the plurality of stator blades 610 are evenly distributed along the circumference of the leading edge of the stator ring 608. In other examples, two or more of the stator blades 610 may have different spacing. In some examples, an edge of each of the stator blades 610 opposite the stator ring 608 is defined by a single height measured from the stator ring 608. In other examples, the height can vary at each stator blades 610, along one or more stator blades 610, or any combination thereof. Moreover, the surface of each stator blades 610 can be smooth, have a pattern formed thereon, can include one or more surface treatments, etc.

As illustrated in FIGS. 7b through 7d, the stator ring 608 may have a revolved wedge-shaped profile. In other words, the cross-section of the stator ring 608 may define a wedge-shaped profile along its perimeter (as illustrated, a circumference), which may be symmetrical as illustrated in FIGS. 7b and 7c, or asymmetrical as illustrated in FIG. 7d (e.g., the wedge may be biased inward toward the axis-of-rotation or outward away from the axis-of-rotation). Biasing the leading edge (e.g., leading edge 624) of the stator ring 608 inward (toward the axis or rotation) or outward (away from the axis or rotation) allows the control of airflow ratio between the inner and outer rotor-stator gaps 626a, 626b, respectively. Further, the wedge-shaped profile may have a rounded profile as illustrated in FIG. 7b or triangular profile as illustrated in FIG. 7b. Although described as a wedge-shaped profile, the profile of the stator ring 608 can take another desired shape, such as circular, square, tubular, triangular, quadrilateral, or other geometry, as is desired to achieve the goals described herein.

The axial stator blades 610 are advantageous as they can be mounted directly to the leading edge of the stator assembly 406b—whether via a stator ring 608 or directly on the stationary motor windings 616. This can be advantageous because a leading edge of the stator assembly 406b is the first stationary component in the region of the thrust assembly 212 behind the fan blades 412 of the axial fan assembly 404. Unlike conventional axial compressors, the row of axial stator blades 610 need not be mounted to an inner hub and/or outer shroud of a motor assembly. Radial fans have the advantage of generating a significant pressure rise even with relatively a low rotation rate. However, exiting airflow from a radial fan generates a large tangential component of airflow velocity. The tangential component causes a decrease in system performance due to air drag.

Figure 7E:
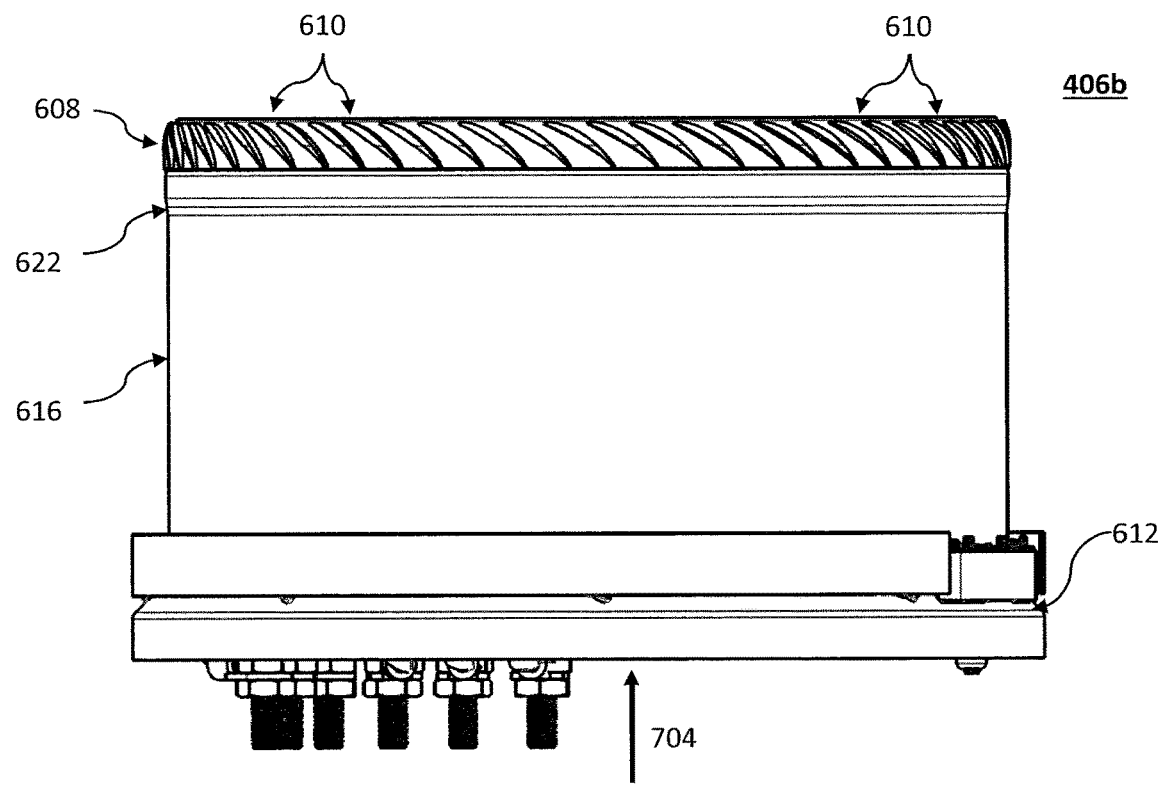
FIGS. 7e and 7f illustrate additional views of the example stator assembly according to a first aspect.
Figure 7F:
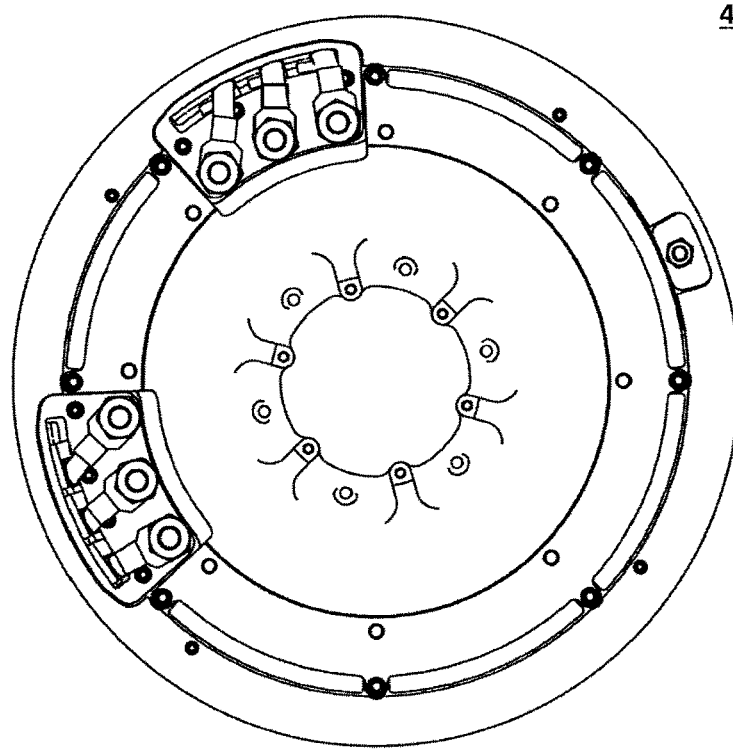

FIG. 7g illustrates a view of the example stator assembly 406b according to a second aspect where the axial stator blades 610 are differently shaped compared to the stator blades 610 of FIG. 7e, but also serve to direct airflow to the rotor-stator gaps, thereby cooling the various components of the electric motor 406. In particular, the shape and orientation of the stator blades 610 with respect to the stator assembly 406b may be attuned. In one example, the stator blades 610 may extend from the stator ring 608 toward the rotor cap 602, such that the leading edge of the stator assembly 406b (e.g., the first stationary surface behind the blades relative to the direction of airflow) is configured to convert tangential kinetic energy (i.e., associated with a velocity component of the airflow) in the cooling airflow aft of the cooling fan rotors into a static pressure rise after interaction with the blade row.

Figure 8C:
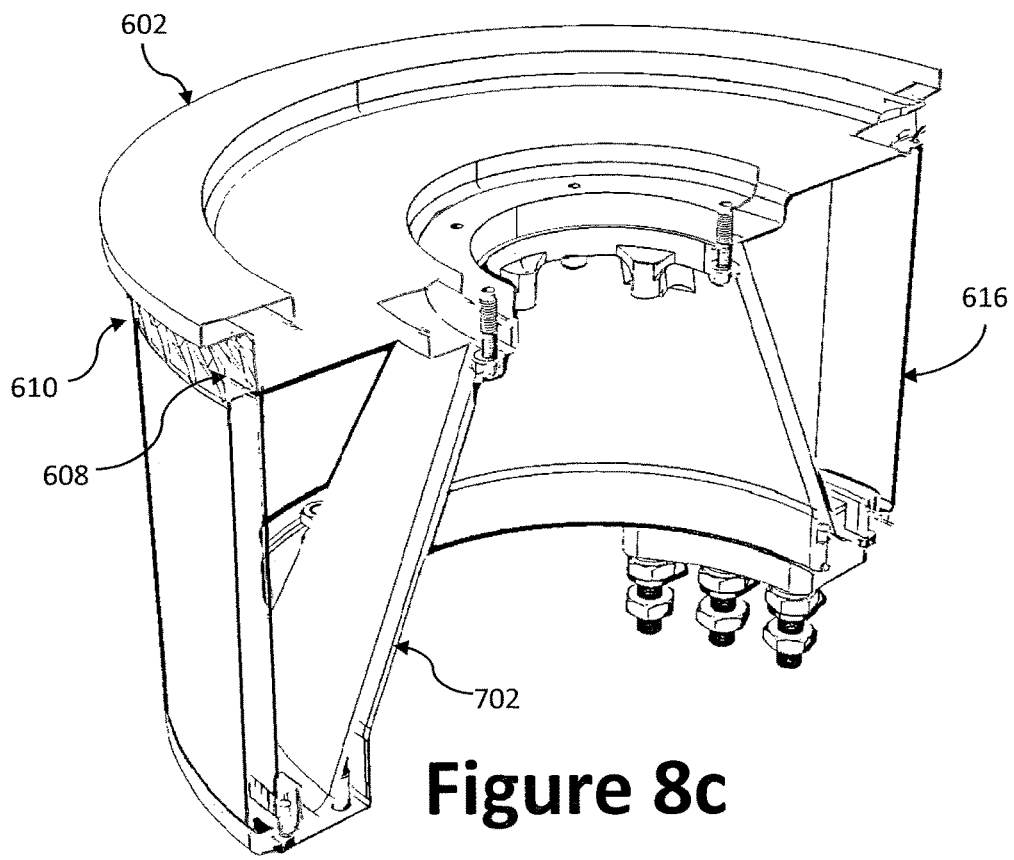
FIGS. 8c and 8d illustrate cut-away and cross-sectional views of an example stator assembly.
Figure 8D:
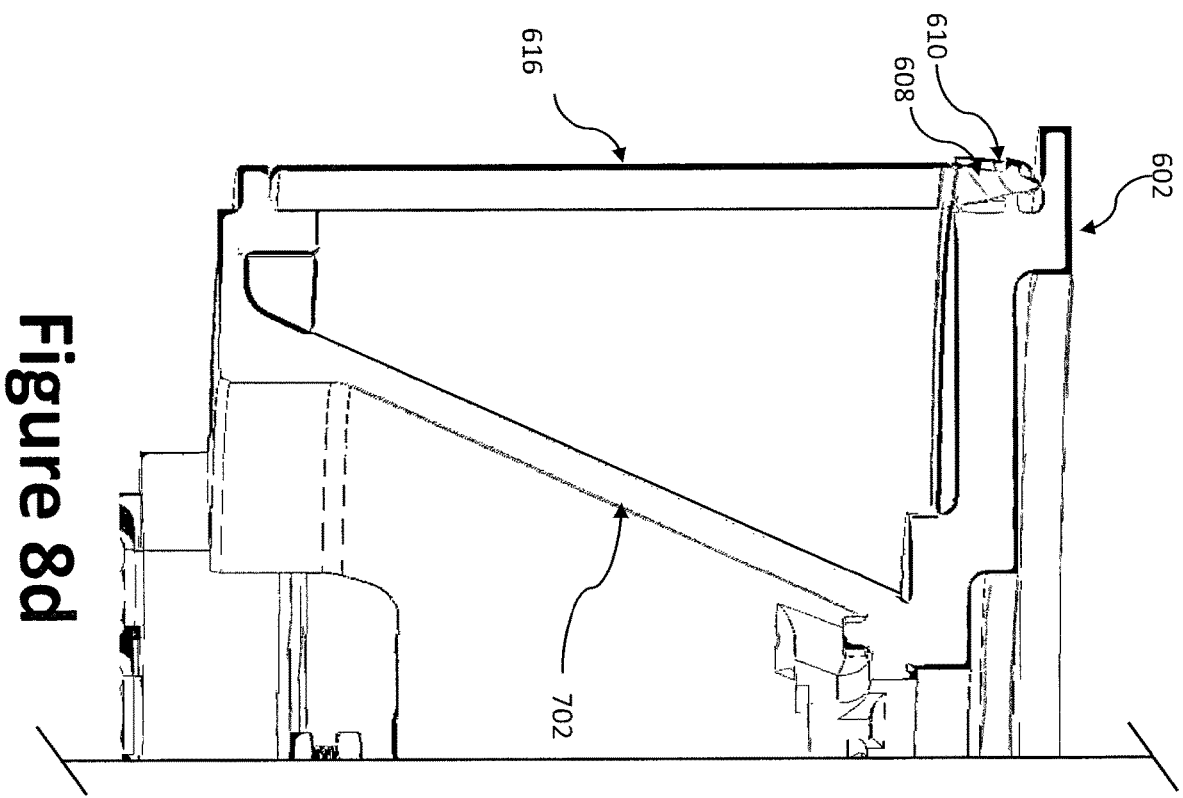

FIG. 8a illustrates a cross-sectional perspective view of an example rotor cap 602 and a rotor insert 800. As illustrated in FIG. 8b, the rotor cap 602 and rotor insert 800 may be configured to mate with the stator ring 608 when the stator assembly 406b is inserted into the rotor assembly 406a to complete the thrust assembly 212. FIGS. 8c and 8d illustrate cross-sectional views of an example stator assembly 406b mated with the rotor cap 602. In particular, the rotor cap 602 covers the stator blades 610 of the stator ring 608.

Figure 9B:
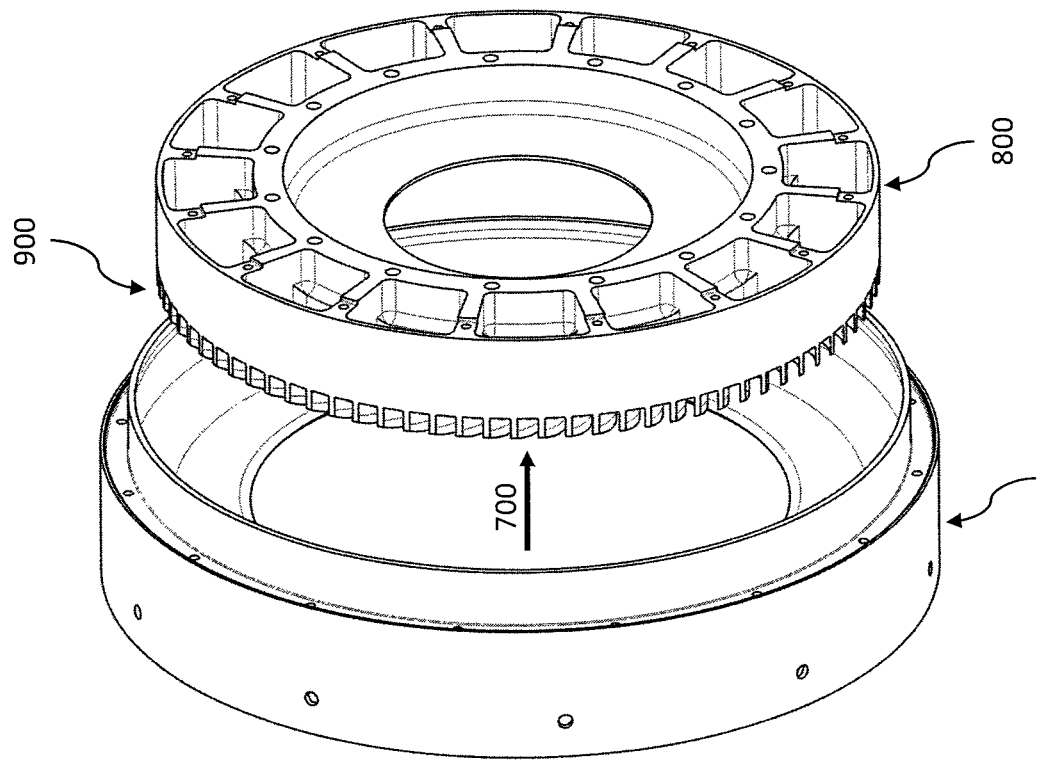
FIGS. 9a and 9b illustrate an example rotor cap with stator blades according to the first aspect.
Figure 9A:
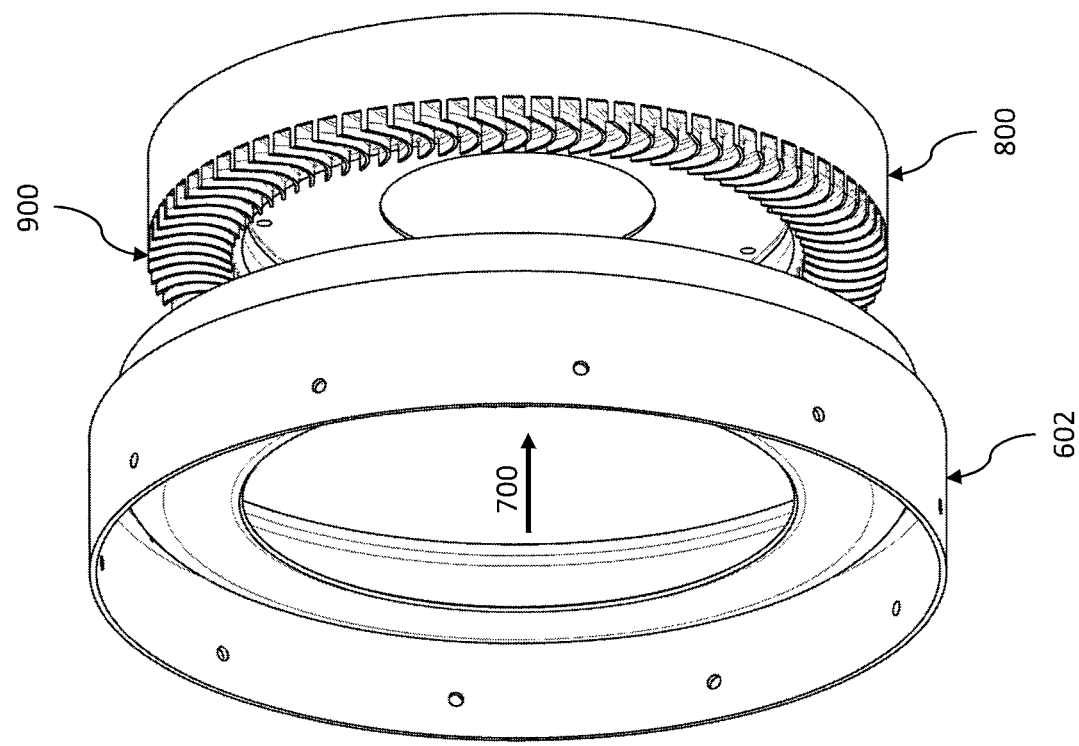

FIGS. 9a and 9b illustrate an example rotor cap 602 configured to mate with a rotor insert 800 that includes a plurality of fins 900 arranged to yield a radial fan. As shown, the rotor insert 800 is configured to mate with a rotor cap 602, which can be fixed by one or more joining techniques such as brazing, welding, etc. Specifically, the airflow during forward flight of the aircraft 100 into the thrust assembly 212 is in the direction of arrow 700. The plurality of fins 900 can be integrally formed on the leading edge of the rotor insert 800, such as by die-casting, 3D printing, or other suitable process. In some examples, the plurality of fins 900 are formed separately from the rotor insert 800 and fixed by one or more joining methods (e.g., brazing, welding, etc.).

As shown in greater detail, infra, the plurality of fins 900 can be defined by a generally semi-circular shape atop the leading edge of the rotor insert 800. In some examples, each of the plurality of fins 900 maintains the same semi-circular arc. In some examples, one or more fins of the plurality of fins 900 are defined by a different arc than another fin. In some examples, each of the fins of the plurality of fins 900 is evenly spaced from one another. In other examples, two or more fins of the plurality of fins 900 have different spacing. In some examples, an edge of each fin of the plurality of fins 900 facing a rotor cap 602 is defined by a single height from interior edge to exterior edge along the rotor insert 800. In other examples, the height can vary along each fin 900, along one or more fins, or any combination thereof.

Figures 9C, 9D, 9E:
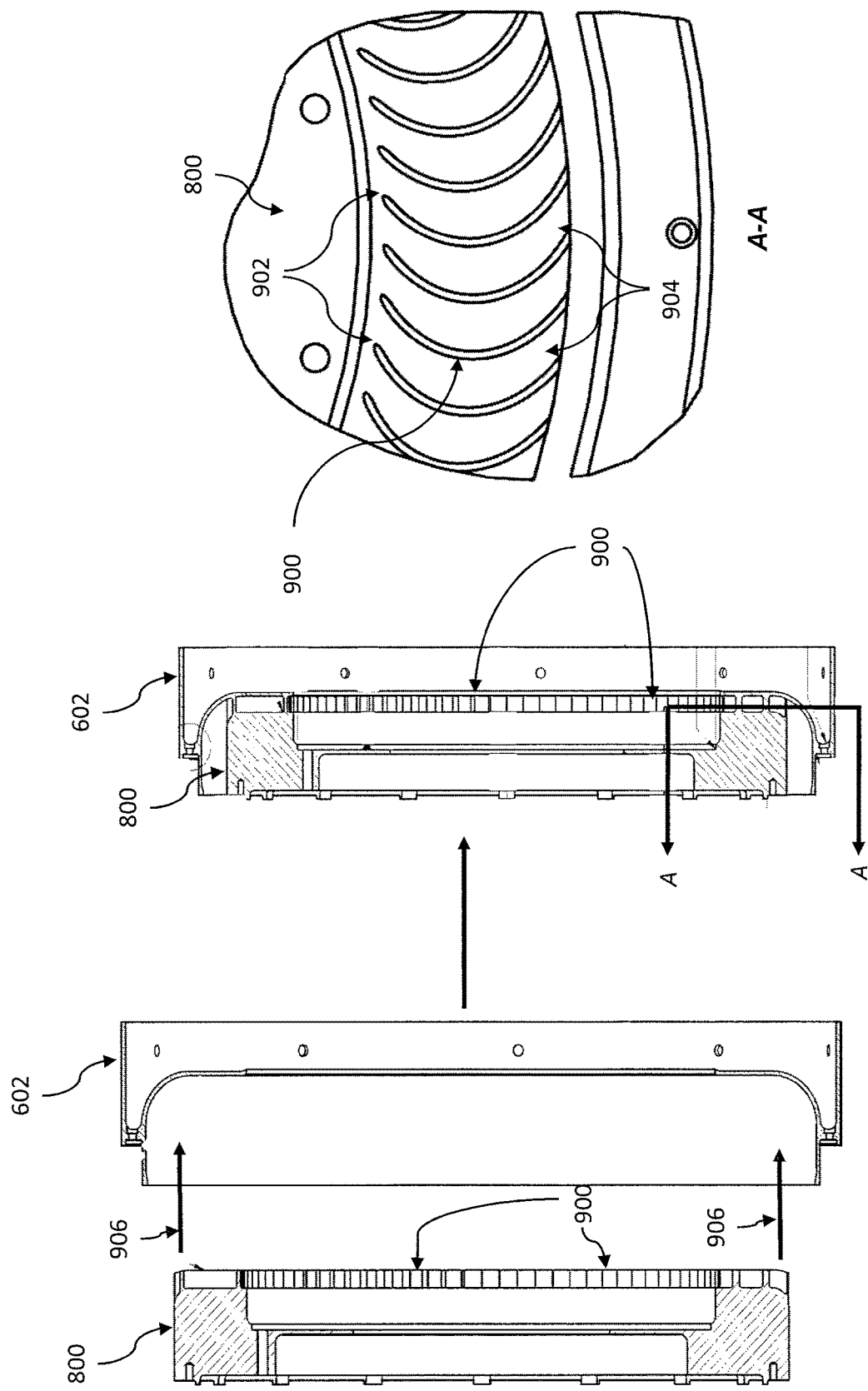
FIGS. 9c through 9e illustrate cross-sectional views of the example rotor cap with stator blades according to the first aspect.

FIGS. 9*c* through 9*e* illustrate cross-sectional views of the stator ring 608 and rotor cap 602. FIG. 9*c* shows the rotor insert 800 and rotor cap 602 prior to joining, with the plurality of fins 900 facing the interior portion of the rotor cap 602. Once mated, along lines 906, the rotor insert 800 is joined within the rotor cap 602, as shown in FIG. 9*d*. FIG. 9*e* illustrates a close-up view of the plurality of fins 900 along lines A-A shown in FIG. 9*d*. Each fin 900 follows a generally semi-circular arc from an interior edge 902 to an exterior edge 904. In other words, the interior edge 902 is closest to a central axis that runs through the rotor cap 602 (as well as the thrust assembly 212, generally). As explained with respect to FIGS. 9*a* and 9*b*, the fins 900 can take a variety of shapes in addition to an arc. For instance, the fins 900 can be straight, can have one or more defined angles, etc. In some examples, each fin 900 can be formed of a continuous fin, be formed from multiple smaller fins, can have gaps or holes in each fin, etc. Moreover, the surface of each fin 900 can be smooth, have a pattern formed thereon, can include one or more surface treatments, etc.

Although the stator ring 608 is described with respect to a stator of a single stage compressor, a revolved-wedge shaped ring can be employed in a multi-stage compressor. Furthermore, consideration should be taken to ensure concentricity of the blades, etc., and to prevent interference of the various parts on the full assembly. Moreover, although described with respect to a fan blade mounted to a leading edge of the stator, the benefits of the present concept could be provided to a system that employs an axial fan as well.

Figure 10:
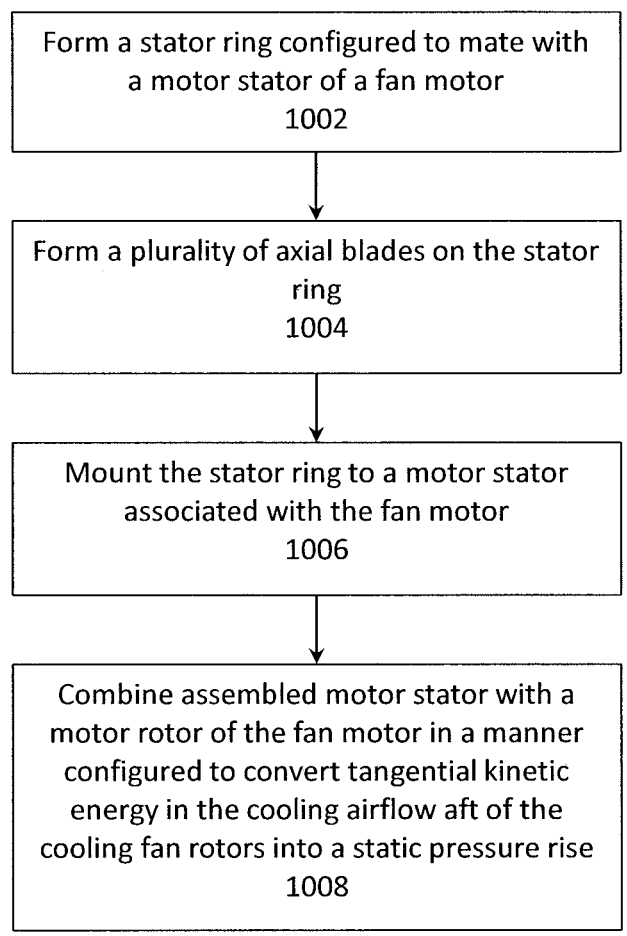
FIG. 10 illustrates an example method of forming a stator ring.

FIG. 10 illustrates an example method 1000 of forming a fan motor configured to convert tangential kinetic energy in the cooling airflow aft of the cooling fan rotors into a static pressure rise. For example, in block 1002, a stator ring 608 is formed to mate with a stator (e.g., the stator housing 616) for the electric motor 406 of the fan. The stator ring 608 is designed to mount on the leading edge of the motor stator (e.g., the leading edge 622 of the stator housing 616), and can be formed of a metal, composite material, or other suitable material. The stator ring 608 can formed in a wedge shape (e.g., flat against the motor stator, extending to a gradual, blunted end on the opposite end). In some examples, the stator ring 608 can be rectangular, circular, or have another suitable geometry.

In block 1004, a plurality of axial stator blades 610 can be formed on the stator ring 608. For example, the axial stator blades 610 can be arranged in a row or line around the perimeter of the stator ring 608 extending therefrom, such a portion of each axial stator blade 610 is formed from an inward diameter of the stator ring 608, around the edge of the wedge, to the outer diameter of the stator ring 608. In other words, each axial stator blade 610 is arranged around the stator ring 608 and extending therefrom, such that the blade is wrapped about a portion of the ring. Moreover, the blades are located such that, when the fan motor is assembled, the blades are at the leading edge of the motor stator.

In block 1006, the stator ring 608 is mounted to a motor stator associated with the fan motor. In block 1008, the assembled motor stator is combined with a motor rotor of the fan motor in a manner configured to convert tangential kinetic energy in the cooling airflow aft of the cooling fan rotors into a static pressure rise.

While the subject disclosure has been discussion primarily in connection with aviation, it would clear to those of skill in the art that it can equally be applied to other systems, including, for example, automobiles, motorcycles, trains, ships, boats, spacecraft, and aircraft.

The above-cited patents and patent publications are hereby incorporated by reference in their entirety. Although various embodiments have been described with reference to a particular arrangement of parts, features, and like, these are not intended to exhaust all possible arrangements or features, and indeed many other embodiments, modifications, and variations will be ascertainable to those of skill in the art. Thus, it is to be understood that the disclosure may therefore be practiced otherwise than as specifically described above.

What is claimed is:

1. A motor assembly comprising:
   a stator assembly;
   a rotor assembly operatively coupled with the stator assembly; and
   a plurality of axial stator blades extending from a first leading edge of the stator assembly, wherein:
   each axial stator blade of the plurality of axial stator blades has a generally curved shape as the stator blade extends from the first leading edge,
   the plurality of axial stator blades is configured to convert, during operation, tangential kinetic energy of an airflow from the rotor assembly to a static pressure rise, and
   a cross-section of the first leading edge of the stator assembly defines a wedge shape.

2. The motor assembly of claim 1, wherein the stator assembly comprises a stator ring mounted to a second leading edge of a stator housing, the stator ring comprising the plurality of axial stator blades extending from the first leading edge of the stator ring.

3. The motor assembly of claim 2, wherein the stator assembly further comprises a cooling flow exit guide, wherein the stator housing is positioned between the stator ring and the cooling flow exit guide.

4. The motor assembly of claim 2, wherein each of said plurality of axial stator blades is arranged around and extending from the stator ring and arranged to wrap around a portion of the first leading edge of the stator ring.

5. The motor assembly of claim 2, wherein a cross-section of the first leading edge of the stator ring defines the wedge shape.

6. The motor assembly of claim 2, wherein the stator assembly is operatively coupled with the rotor assembly to define an inner gap and an outer gap.

7. The motor assembly of claim 6, wherein the stator ring is configured to control a ratio of airflow mass entering the outer gap and the inner gap.

8. The motor assembly of claim 7, wherein the first leading edge of the stator ring is biased to control the ratio of airflow mass entering the outer gap and the inner gap.

9. The motor assembly of claim 1, wherein the rotor assembly comprises a rotor cap and a rotor housing, wherein the rotor cap and the rotor housing are concentric.

10. The motor assembly of claim 9, wherein the rotor cap comprises a plurality of fins arranged to yield a radial fan.

11. The motor assembly of claim 10, wherein at least one of the plurality of axial stator blades defines a generally semi-circular shape.

12. The motor assembly of claim 10, wherein the plurality of fins is arranged to direct cooling air to the plurality of axial stator blades.

13. The motor assembly of claim 12, wherein the plurality of axial stator blades is configured to de-swirl the cooling air.

14. A method of forming an electric motor, the method comprising:
   providing a stator ring having a plurality of axial stator blades, wherein the stator ring is configured to couple with a stator assembly of the electric motor;
   mounting the stator ring to the stator assembly such that the plurality of axial stator blades is arranged on a leading edge of the stator assembly,
   wherein:
      each axial stator blade of the plurality of axial stator blades has a generally curved shape as the stator blade extends from the leading edge of the stator assembly,
      the plurality of axial stator blades is configured to convert, during operation, tangential kinetic energy of an airflow from a rotor assembly to a static pressure rise, and
      a cross-section of a leading edge of the stator ring defines a wedge shape.

15. The method of claim 14, wherein the stator ring comprises a metal material.

16. The method of claim 14, wherein the stator ring comprises a composite material.

17. The method of claim 14, wherein the stator assembly further comprises a cooling flow exit guide.

18. The method of claim 14, wherein each of said plurality of axial stator blades is arranged around and extending from the stator ring and arranged to wrap around a portion of the leading edge of the stator ring.

* * * * *